United States Patent
Kim et al.

(10) Patent No.: US 9,516,241 B2
(45) Date of Patent: Dec. 6, 2016

(54) BEAMFORMING METHOD AND APPARATUS FOR SOUND SIGNAL

(71) Applicant: Samsung Electronics Co., Ltd., Gyeonggi-do (KR)

(72) Inventors: Soo-Hyung Kim, Gyeonggi-do (KR); Hyun-Soo Kim, Gyeonggi-do (KR); Sung-Hyuk Shin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 14/302,380

(22) Filed: Jun. 11, 2014

(65) Prior Publication Data

US 2014/0362253 A1  Dec. 11, 2014

(30) Foreign Application Priority Data

Jun. 11, 2013  (KR) .................. 10-2013-0066257

(51) Int. Cl.
| | | |
|---|---|---|
| *H04N 5/262* | (2006.01) | |
| *H04R 3/00* | (2006.01) | |
| *G06T 7/00* | (2006.01) | |
| *G01S 17/02* | (2006.01) | |
| *G01S 17/89* | (2006.01) | |

(52) U.S. Cl.
CPC .............. *H04N 5/262* (2013.01); *G06T 7/004* (2013.01); *H04R 3/005* (2013.01); *G01S 17/023* (2013.01); *G01S 17/89* (2013.01); *G06T 2207/10028* (2013.01); *H04R 2430/25* (2013.01)

(58) Field of Classification Search
CPC .................. H04N 5/262; G06T 7/004; G06T 2207/10028; H04R 3/005
USPC .............................. 348/231.4, 14.01, 207.99
See application file for complete search history.

(56) References Cited

U.S. PATENT DOCUMENTS

| | | | |
|---|---|---|---|
| 5,937,070 A | 8/1999 | Todter et al. | |
| 7,864,210 B2* | 1/2011 | Kennedy ................ | H04N 7/142 348/14.01 |
| 2010/0123785 A1 | 5/2010 | Chen et al. | |
| 2010/0245624 A1* | 9/2010 | Beaucoup .............. | H04N 5/772 348/231.4 |
| 2011/0085061 A1* | 4/2011 | Kim ..................... | H04R 29/004 348/240.99 |
| 2013/0315034 A1* | 11/2013 | Yagihashi ............... | H04R 1/32 367/103 |
| 2014/0029761 A1* | 1/2014 | Maenpaa .............. | H04R 3/005 381/92 |

FOREIGN PATENT DOCUMENTS

| | | |
|---|---|---|
| JP | 2012-074880 | 4/2012 |
| KR | 10-2012-0049534 | 5/2012 |
| KR | 10-2012-0071452 | 7/2012 |

\* cited by examiner

*Primary Examiner* — Nhan T Tran

(57) ABSTRACT

A beamforming method and apparatus for acquiring a sound signal in an electronic device includes selecting at least one object for beamforming to acquire a sound, measuring a first distance between the at least one object selected and a sensor for distance measurement, calculating a second distance between the at least one object and a plurality of microphones based on the first distance, and determining a weight for sound beamforming using at least one of time delay and phase delay corresponding to the second distance between the object and the microphone.

22 Claims, 16 Drawing Sheets

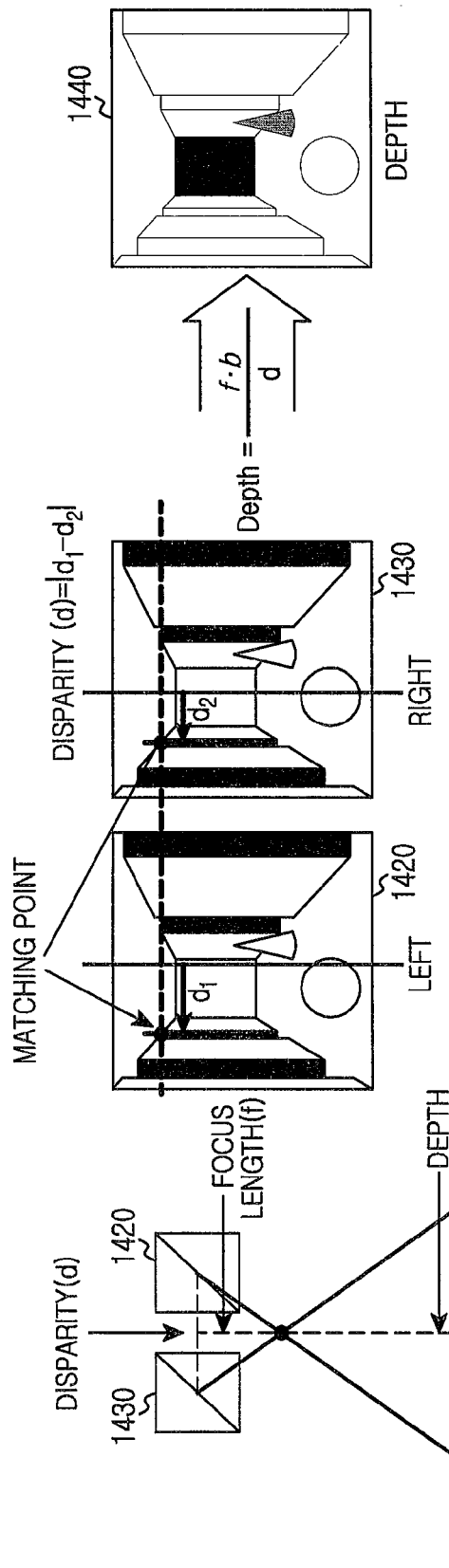

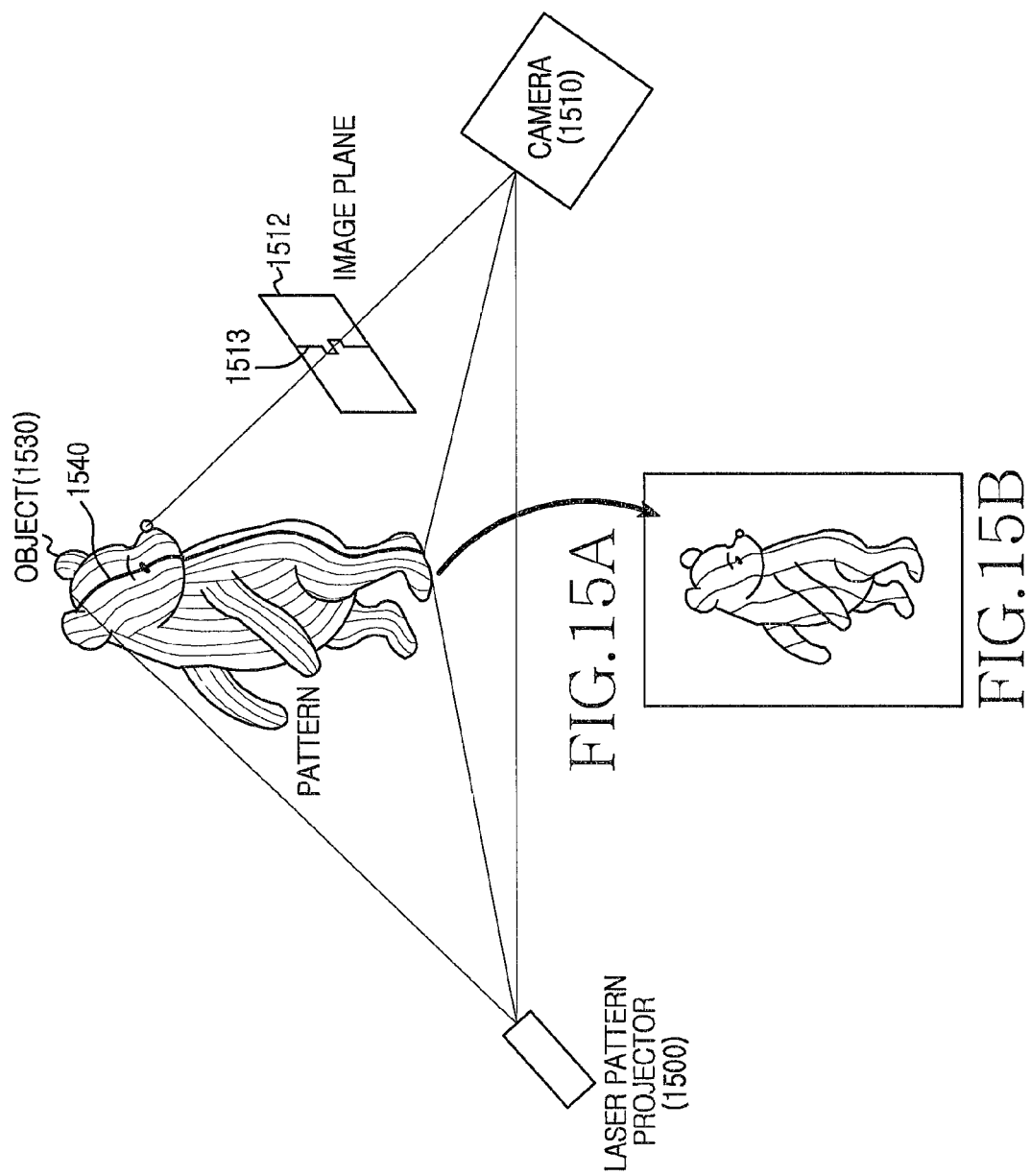

BEAMFORMING METHOD AND APPARATUS FOR SOUND SIGNAL

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jun. 11, 2013 and assigned Serial No. 10-2013-0066257, the entire disclosure of which is hereby incorporated by reference.

TECHNICAL FIELD

The present disclosure relates generally to a technique for selectively amplifying a sound source signal using an electronic device. More particularly, the present disclosure relates to a method and an apparatus for obtaining a sound signal using beamforming in the electronic device.

BACKGROUND

An electronic device such as portable terminal, mobile terminal, and smart phone mostly provides functions such as phone call, voice recording, and video recording. To support the phone call, voice recording, and video recording functions, the electronic device requisitely includes a microphone for converting a sound to an electric signal.

The electronic device such as smart phone includes a plurality of microphones including a microphone for the phone call and a microphone for the video recording.

When a user wants to input a particular one of multiple sound sources through the electronic device and a location of the microphone of the electronic device has directivity toward the voice signal input, it can overcome ambient noise input.

When software processing is applied to cancel the noise of the voice input through the microphone array, beam can be formed in a particular direction from the microphone array. As such, the beamforming technique is used to form the beam using the microphone array and to exhibit the directivity in the desired direction from the microphone.

When the directivity is obtained in the user's voice direction using the beamforming technique, an energy corresponding to the voice signal from directions outside the beam can be attenuated and the voice signal input from the desired direction can be selectively acquired. By virtue of the beamforming technique, the microphone array can suppress part of an indoor ambient noise such as computer fan noise and TV sound, and reverberations reflected from an object such as furniture and wall. For example, the microphone array can obtain a higher Signal to Noise Ratio (SNR) from the voice signals of the desired beam using the beamforming technique. Hence, the beamforming can play an important role in spatial filtering which points the bema to the sound source and suppresses every signal input from the other directions.

However, the conventional beamforming technique applies a linear filter, which can enhance or attenuate the signal of the known sound direction, to the input signal, and is widely used in a system using the microphone array. Disadvantageously, its performance is affected by the location and the direction of the voice signal.

SUMMARY

To address the above-discussed deficiencies, it is a primary aspect of the present disclosure to provide a method and an apparatus for acquiring a desired sound source over various ambient noises during phone call, voice recording, or video recording in an electronic device including a plurality of microphones.

Another aspect of the present disclosure is to provide a method and an apparatus that selects a desired sound source from an object during phone call, voice recording, or video recording in an electronic device including a plurality of microphones.

Yet another aspect of the present disclosure is to provide a method and an apparatus that measures a distance between a particular object and a microphone for beamforming using a distance between the particular object and an image sensor for the distance measurement.

A further aspect of the present disclosure is to provide a method and an apparatus that records a video by selecting a desired object sound source in an electronic device including a dual image sensor.

A further aspect of the present disclosure is to provide a method and an apparatus that records a video by selecting a desired object sound source in a wearable device including an image sensor.

According to one aspect of the present disclosure, a method for operating an electronic device includes selecting at least one object for beamforming so as to acquire a sound; measuring a first distance between the at least one object selected and a sensor for distance measurement; calculating a second distance between the at least one object and a plurality of microphones based on the first distance; and determining a weight for sound beamforming using at least one of time delay and phase delay corresponding to the second distance between the object and the microphone.

The method may further include re-measuring the first distance between the object and the distance measurement sensor by detecting a location change of the object; calculating the second distance between the object and the microphones based on the first distance re-measured; and re-determining the weight for the sound beamforming using the at least one of time delay and the phase delay corresponding to the second distance between the object and the microphone.

The selecting of the at least one object may include selecting the object in a displayed image using at least one of user touch input, face recognition, lip motion detection, lip recognition, and voice recognition.

The beamforming for acquiring the sound may be performed for at least one of voice acquisition during video recording, voice recording, photo shooting, or game, and phone call.

Even when a display of turned off in a power-saving mode in process of the voice acquisition during the video recording, the voice recording, the photo shooting, or the game, or the phone call, the sound beamforming may be performed by tracking the selected object.

The determining of the weight for the sound beamforming may be performed using one of Generalized Side-lobe Canceller (GSC) and Linearly Constrained Minimum Variance (LCMV).

The distance measurement sensor may include at least one of a 3D image sensor, a 3D depth sensor, and a distance measurement sensor.

The first distance between the at least one selected object and the distance measurement sensor may be measured using a distance measurement method using the 3D depth sensor or the 3D image sensor, for example, using one of a stereo type using a plurality of image sensors, a Time of Flight (TOF) type using a depth camera, and a structured light type for extracting the distance by emitting a patterned light and determining curve or shift of the image.

When the distance is measured using the 3D depth sensor or the 3D image sensor, a distance or an angle to the object may be measured based on a depth map.

According to another aspect of the present disclosure, a method for operating an electronic device includes obtaining a first image and a second image from at least one of a first and second image sensor; selecting an object for measuring a distance to the first image sensor, in the first image; calculating a second distance between a plurality of microphones and the object using the first distance between the first image sensor and the object, and performing beamforming toward the first image sensor; and recording and storing a sound signal beamformed toward the first image sensor, together with at least one of the first image and the second image.

The performing of the beamforming toward the first image sensor may include determining a weight for sound beamforming using time delay or phase delay corresponding to the second distance between the object and the microphone; and forming a beam and receiving a sound by applying the sound beamforming weight to the microphones.

The object may be a user of the electronic device.

According to yet another aspect of the present disclosure, a method for operating an electronic device includes obtaining a first image and a second image from a first or second image sensor; performing sound beamforming in at least one of a first direction and a second direction; and recording and storing a sound signal beamformed in at least one of the first direction and the second direction, together with the first image or the second image. The first direction faces the first image sensor and the second direction faces the second image sensor.

According to still another aspect of the present disclosure, an electronic device includes a user interface that selects at least one object for beamforming so as to acquire a sound; and a processor that measures a first distance between the at least one object selected and a sensor for distance measurement, calculating a second distance between the at least one object and a plurality of microphones based on the first distance, and determining a weight for sound beamforming using at least one of time delay and phase delay corresponding to the second distance between the object and the microphone.

The processor re-measures the first distance between the object and the distance measurement sensor by detecting a location change of the object, calculates the second distance between the object and the microphones based on the first distance re-measured, and re-determines the weight for the sound beamforming using at least one of the time delay and the phase delay corresponding to the second distance between the object and the microphone.

The at least one object may be selected in a displayed image using one of user touch input, face recognition, lip motion detection, lip recognition, object selection using hovering, object selection using eye detection, and voice recognition.

The beamforming for acquiring the sound may be performed for at least one of voice acquisition during video recording, voice recording, photo shooting, or game, and phone call.

Even when a display of turned off in a power-saving mode in process of the voice acquisition during the video recording, the voice recording, the photo shooting, or the game, or the phone call, the sound beamforming may be performed by tracking the selected object.

The weight for the sound beamforming may be determined using one of GSC and LCMV.

The distance measurement sensor may include at least one of a 3D image sensor, a 3D depth sensor, and a distance measurement sensor.

The first distance between the at least one selected object and the distance measurement sensor may be measured using a distance measurement method using the 3D depth sensor or the 3D image sensor, for example, using one of a stereo type using a plurality of image sensors, a TOF type using a depth camera, and a structured light type for extracting the distance by emitting a patterned light and determining curve or shift of the image.

When the distance is measured using the 3D depth sensor or the 3D image sensor, a distance or an angle to the object may be measured based on a depth map.

According to a further aspect of the present disclosure, an electronic device includes a processor that obtains a first image and a second image from at least one of a first and second image sensor, selecting an object for measuring a distance to the first image sensor, in the first image, calculating a second distance between a plurality of microphones and the object using the first distance between the first image sensor and the object, performing beamforming toward the first image sensor, and recording and storing a sound signal beamformed toward the first image sensor, together with the first image or the second image.

To perform the beamforming toward the first image sensor, the processor may determine a weight for sound beamforming using at least one of time delay and phase delay corresponding to the second distance between the object and the microphone, and form a beam and receives a sound by applying the sound beamforming weight to the microphones.

The object may be a user of the electronic device.

According to a further aspect of the present disclosure, an electronic device includes a processor for obtaining a first image and a second image from at least one of a first and second image sensor, performing sound beamforming in a first direction or a second direction, and recording and storing a sound signal beamformed in the first direction or the second direction, together with the first image or the second image. The first direction faces the first image sensor and the second direction faces the second image sensor.

Other aspects, advantages, and salient features of the disclosure will become apparent to those skilled in the art from the following detailed description, which, taken in conjunction with the annexed drawings, discloses example embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 14A, 14B, and 14C illustrate stereo-type distance measurement according to an example embodiment of the present disclosure;

FIGS. 15A and 15B illustrate structured light distance measurement according to an example embodiment of the present disclosure.

Throughout the drawings, like reference numerals will be understood to refer to like parts, components and structures.

DETAILED DESCRIPTION

Figure 1:
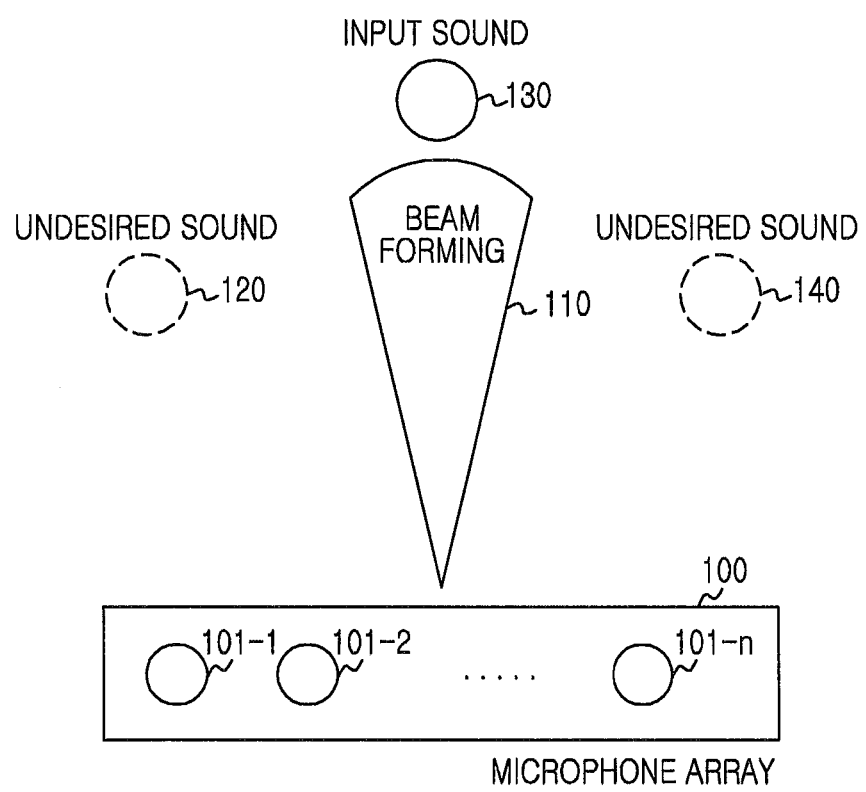
FIG. 1 illustrates beamforming for receiving a desired sound source and attenuating an undesired sound source using a microphone array according to an example embodiment of the present disclosure.

FIGS. 1 through 16B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The following description with reference to the accompanying drawings is provided to assist in a comprehensive understanding of example embodiments of the disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of example embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was desired to provide.

Example embodiments of the present disclosure provide a method and an apparatus for selectively acquiring a desired sound source from various ambient noises during, for example, phone call, recording, or video recording, in an electronic device including a plurality of microphones.

In an embodiment, a first distance from a sensor for distance measurement to a selected object is measured, a delay (or a second distance) to the microphones is calculated based on the first distance measured, and thus the sound source can be selectively acquired by applying the calculated delay to a filter and a sound correction algorithm.

In addition, example embodiments of the present disclosure provide a method and an apparatus for recording a video by selecting a desired object sound source in an electronic device including a dual image sensor.

FIG. 1 illustrates beamforming for receiving a desired sound source and attenuating an undesired sound source using a microphone array according to an example embodiment of the present disclosure.

Referring to FIG. 1, a plurality of microphones 101-1 through 101-n can construct an array at regular or irregular intervals. The microphone array 100 can be included in the electronic device, for example, a smart phone or a video camcorder.

In FIG. 1, the microphone array can select and output only a sound signal of a sound source 130 of a preset direction (or a desired direction) 110 from received voices signal and noise signal, and cancel sound signals from undesired sound sources 120 and 140.

Beamforming for forming a beam in a particular direction is classified to fixed beamforming and adaptive beamforming based on input information. A representative example of the fixed beamforming is Delay and Sum Beamforming (DSB), which matches phase of a target signal by compensating for a time delay of input signals per channel. Besides, the fixed beamforming includes Least Mean Square (LMS) and Dolph-Chebyshev. However, since a weight of a beamformer is fixed by signal location, frequency, and a channel spacing, the fixed beamforming is not adaptive to the signal environment and its performance is limited.

By contrast, the adaptive beamforming is designed to change the weight of the beamformer according to the signal environment. A representative adaptive beamforming includes Generalized Side-lobe Canceller (GSC) and Linearly Constrained Minimum Variance (LCMV). The GSC can include a fixed beamformer, a target signal blocking matrix, and a multiple input canceller. The target signal blocking matrix can block the voice signal and outputs only the noise signal using the input signals. The multiple input canceller can cancel the noise again in the output signal of the fixed beamformer using the noise signals output from the target signal blocking matrix.

Figure 2:
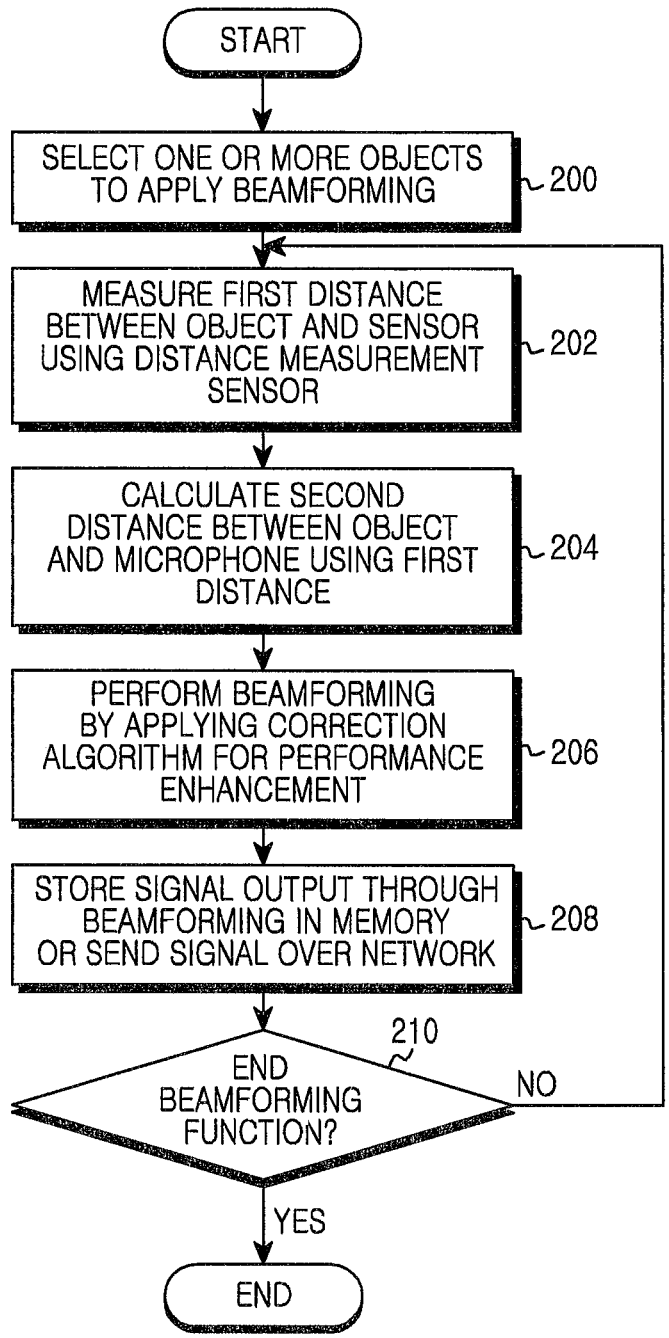
FIG. 2 illustrates a process of beamforming for acquiring a sound signal in an electronic device including a plurality of microphones according to an example embodiment of the present disclosure.

FIG. 2 illustrates a process of beamforming for acquiring a sound signal in an electronic device including a plurality of microphones according to an example embodiment of the present disclosure.

Referring to FIG. 2, the electronic device can select at least one object to apply the beamforming through its embedded microphone array in operation 200. The object to apply the beamforming generates the sound signal and can include, for example, a user of the electronic device, a third party, an animal, a machine, and a material in vicinity. The object to apply the beamforming can be selected before or during, for example, photo shooting, video recording, voice recording, or phone call.

Herein, the object to apply the beamforming can be selected using an image captured by an image sensor of the electronic device, or using voice recognition. For example, referring to FIG. 3, at least one object in a displayed image can be selected using hovering or touch. For example, a particular face in the displayed image may be recognized and automatically selected. For example, a lip motion of the person in the displayed image may be automatically selected using recognition or lip recognition. For example, the face recognition may trace a particular person and perform the beamforming based on the particular person, the lip motion recognition may trace the speaker and perform the beamforming based on the speaker, and the lip recognition may recognize the lips in the face and enhance the beamforming performance by measuring the accurate distance to the lips from which the sound of the object is produced.

For example, when a voice registered in advance is input, the object corresponding to the input voice can be selected using the voice recognition. For example, when a particular voice is input, a location or a direction of the object corresponding to the particular voice may be detected and thus the beam may be formed to the object corresponding to the particular voice.

For example, the object can be selected using all of the voice recognition, the face recognition, and the lip recognition. For example, the beamforming can be performed by recognizing a particular person in the displayed image and tracing the lip motion of the particular person.

In operation 202, the electronic device can measure a first distance between the selected object and a sensor for the distance measurement, using the distance measurement sensor. The distance measurement sensor can employ one of an infrared distance measurement sensor, an ultrasonic distance measurement sensor, and a 3D depth sensor or a 3D image sensor for acquiring 3D information from images.

The distance measurement using the 3D depth sensor or the 3D image sensor can adopt, for example, a stereo type (see FIG. 14) using a plurality of image sensors, a Time of Flight (TOF) type (see FIG. 16) using a depth camera, and a structured light type (see FIG. 15) for extracting the distance by emitting the patterned light and determining curve or shift of the image. The stereo type, the TOF type, and the structured light type can extract the distance between the object and the sensor or between the object and the camera, and an angle based on the image center using on a depth map. Herein, an algorithm for extracting the distance between the object and the sensor or between the object and the camera, and the angle based on the image center using the depth map can be realized using various distance measurement and angle measurement algorithms, and is not limited to one specific distance measurement and angle measurement algorithm.

The stereo type measures a 3D shape of the environment/object using images from a pair of cameras, such as human eyes, or two or more cameras. For example, the stereo type measures the distance using a phase difference of two or more image sensors, the TOF type measures the distance based on a time difference reflected by the object, and the structured light type extracts the distance by emitting the patterned light and determining the curve or the shift of the image.

Yet, the present disclosure is not limited to 3D depth sensor or the 3D image sensor for the stereo type, the TOF type, and the structured light type, and can employ various image sensors and various distance measurement sensors capable of measuring the distance to the object.

In operation 204, the electronic device can calculate a second distance or a time delay (or phase delay) between the selected object and the microphone using the first distance measured. The second distance using the first distance can be measured according to one example embodiment of the present disclosure of, but not limited to, FIGS. 4 through 8. Alternatively, the second distance can be calculated in a structure including the microphone.

In operation 206, based on the time delay or the phase delay corresponding to the second distance between the selected object and the microphone, the electronic device can perform the beamforming by applying the filter and the correction algorithm for the performance enhancement, for example, the adaptive beamforming such as GSC and LCMV. For example, FIG. 9 is a block diagram of the GSC.

Figure 9:
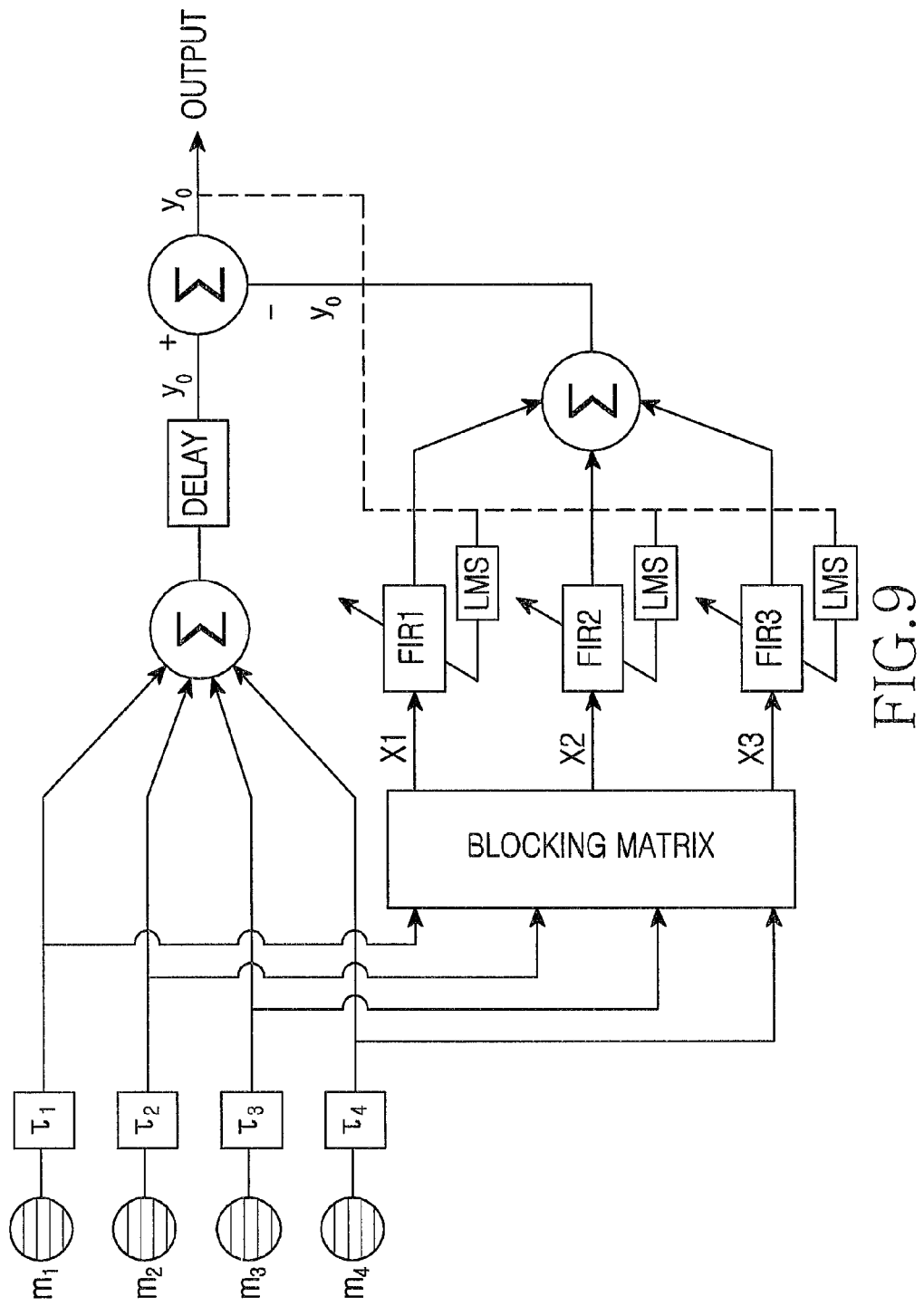
FIG. 9 illustrates a Generalized Sidelobe Canceller (GSC) for the beamforming according to an example embodiment of the present disclosure.

The present disclosure is not limited to the GSC block diagram of FIG. 9, and can employ various filters and correction algorithms for the performance enhancement.

That is, in operation 206, the electronic device can acquire the sound signal from the selected object by applying the corresponding filter or correction algorithm, based on the time delay or the phase delay corresponding to the second distance.

In operation 208, the electronic device can store the sound signal of the object, which is beamformed and received, in a memory or send the sound signal over a network. For example, the sound signal beamformed and input through the microphone can be stored in an internal memory of the electronic device or sent to the network through a communication module of the electronic device according to an operation mode (e.g., phone call, voice recording, and video recording).

When the beamforming is ended in operation 210, the electronic device finishes the beamforming. By contrast, when the beamforming is not ended, the electronic device goes back to operation 202. For example, the electronic device can periodically or aperiodically trace and measure the distance between the selected object and the distance measurement sensor (e.g., 3D image sensor, distance measurement sensor) until the beamforming is ended, and calculate and apply the time delay or the phase delay between the selected object and the microphone using the first distance, to the filter and the correction algorithm.

Figure 3A:
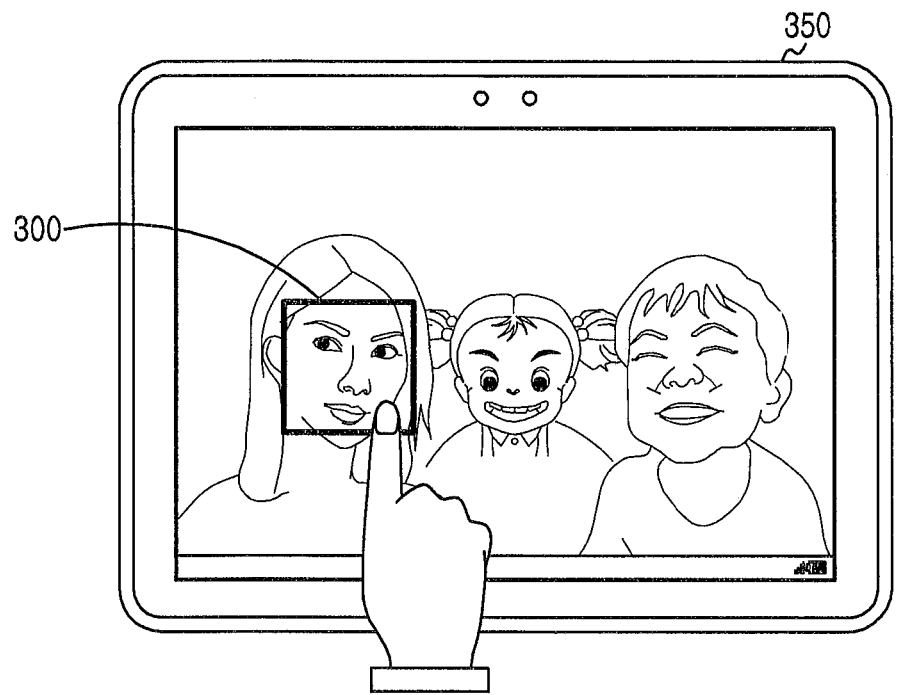
FIGS. 3A and 3B illustrate a user interface for selecting a beamforming object for acquiring the sound signal according to an example embodiment of the present disclosure.
Figure 3B:
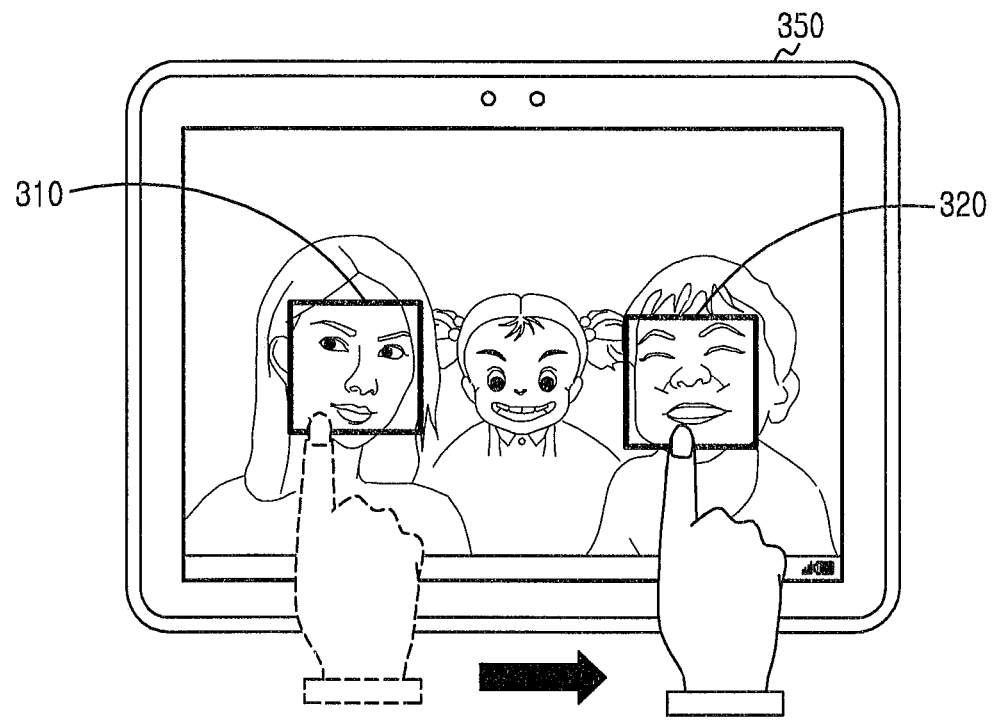

FIGS. 3A and 3B illustrate a user interface for selecting the beamforming object according to an example embodiment of the present disclosure.

Referring to FIG. 3A, an electronic device 350 can display an image through the image sensor, and the user can touch one object 300 in the image. For example, a particular face 300 may be recognized and automatically selected in the displayed image. For example, the movement of the lips may be recognized and automatically selected in the displayed image. For example, when the preregistered voice is input, the object corresponding to the input voice can be selected through the voice recognition. For example, when a particular voice is input, the location or the direction of the object corresponding to the particular voice may be detected and thus the beam may be formed to the object corresponding to the particular voice. For example, the object can be selected using all of the voice recognition, the face recognition, and the lip recognition. For example, the beamforming can be performed by recognizing a particular person in the displayed image and tracing the lip motion of the particular person.

Referring to FIG. 3B, an electronic device 350 can display an image through the image sensor, and the user can touch and select two or more objects 310 and 320 in the image. For example, two or more particular faces 310 and 320 may be recognized and automatically selected in the displayed image. For example, two or more lips or lip motions may be recognized and automatically selected in the displayed image. For example, when the preregistered voice is input, two or more objects corresponding to the input voice can be selected through the voice recognition. For example, when two or more particular voices are input, the location or the direction of the objects corresponding to the particular voices may be detected and thus multibeam may be formed to the objects corresponding to the two or more particular voice. For example, two or more objects can be selected using all of the voice recognition, the face recognition, and the lip recognition. For example, multi-beamforming can be performed by recognizing two or more particular persons in the displayed image and tracing the lips or the lip motion of the two or more persons.

FIGS. 3A and 3B depict the user interface for selecting the single object and the multiple objects. The object can be selected using the face recognition, the lip motion recognition, the voice recognition, or the user gesture such as touch. When the voice recording is necessary in the moving image or still image shooting, the beamforming can be performed. The desired sound can be obtained during the voice recording, the phone call, or the video call.

FIGS. 4 through 8 depict the arrangement of the distance measurement sensor and the microphones and the distance calculation between the object and the microphone in the electronic device.

Figure 4A:
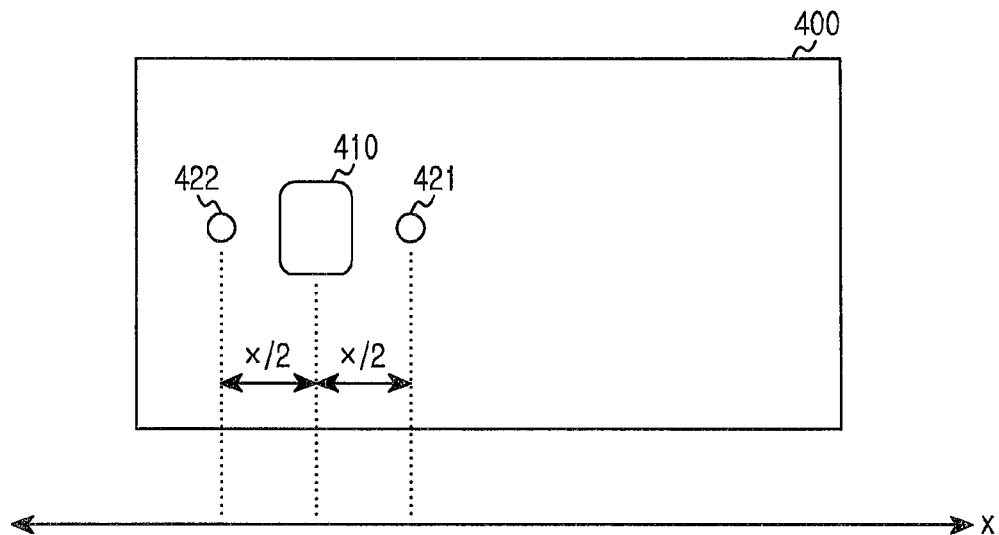
FIGS. 4A, 4B, and 4C illustrate two microphones disposed horizontally at regular intervals and their distance calculation in the electronic device according to an example embodiment of the present disclosure.
Figures 4B, 4C:
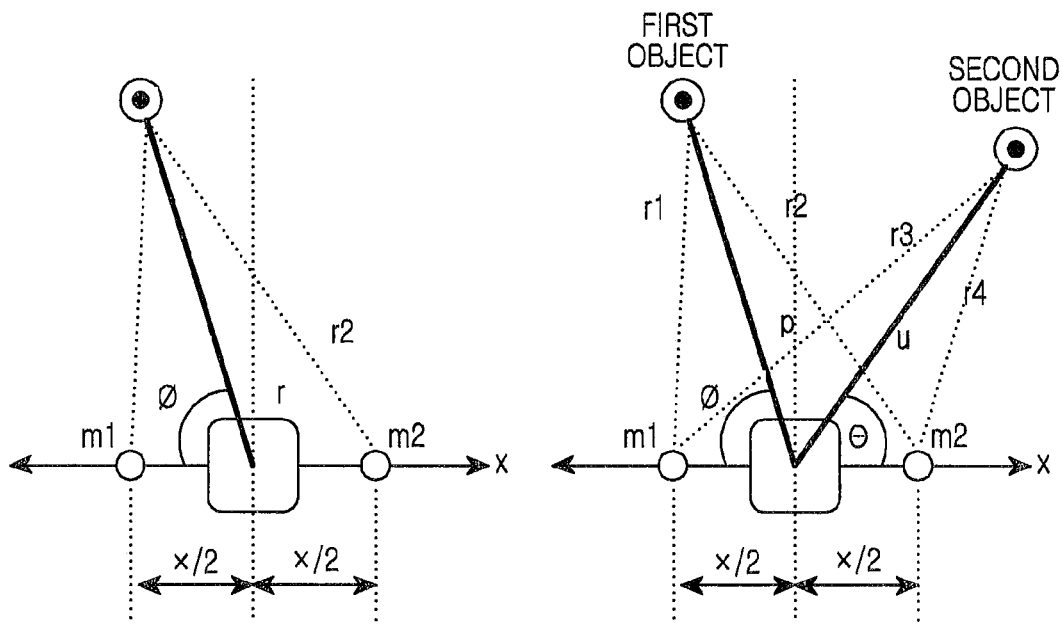

FIGS. 4A, 4B, and 4C illustrate two microphones disposed horizontally at regular intervals and the distance calculation in the electronic device according to an example embodiment of the present disclosure.

An electronic device 400 of FIG. 4A includes a distance measurement sensor 410 and a plurality of microphones 421 and 422 horizontally at regular intervals. When one object of FIG. 4A is selected, the distance between the selected object and the microphones 421 and 422 is calculated in FIG. 4B. When two objects of FIG. 4A are selected, the distances between the selected object and the microphones 421 and 422 are calculated in FIG. 4C.

In FIG. 4B, the distances between one object and the microphones 421 and 422 can be calculated based on Equation 1.

$$r_1 = \sqrt{r^2 + \left(\frac{x}{2}\right)^2 - rx\cos\phi} \qquad (1)$$

$$r_2 = \sqrt{r^2 + \left(\frac{x}{2}\right)^2 + rx\cos\phi}$$

Herein, $r_1$ denotes the distance between the object and the first microphone, r denotes the distance between the object and the distance measurement sensor, x denotes the distance between the first microphone and the second microphone, and $\phi$ denotes an angle between a line segment corresponding to the distance r and a line segment corresponding to the distance between the microphone and the distance measurement sensor.

In FIG. 4C, the distances between the two objects and the microphones 421 and 422 can be calculated based on Equation 2.

$$r_1 = \sqrt{p^2 + \left(\frac{x}{2}\right)^2 - px\cos\phi} \qquad (2)$$

$$r_2 = \sqrt{p^2 + \left(\frac{x}{2}\right)^2 + px\cos\phi}$$

$$r_3 = \sqrt{u^2 + \left(\frac{x}{2}\right)^2 + ux\cos\theta}$$

$$r_4 = \sqrt{u^2 + \left(\frac{x}{2}\right)^2 - ux\cos\theta}$$

Herein, $r_1$ denotes the distance between the first object and the first microphone, $r_2$ denotes the distance between the first object and the second microphone, p denotes the distance between the first object and the distance measurement sensor, x denotes the distance between the first microphone and the second microphone, and ϕ denotes an angle between a line segment corresponding to the distance p and a line segment corresponding to the distance between the microphone and the distance measurement sensor, $r_3$ denotes the distance between the second object and the first microphone, $r_4$ denotes the distance between the second object and the second microphone, u denotes the distance between the second object and the distance measurement sensor, and ϕ denotes an angle between a line segment corresponding to the distance u and the line segment corresponding to the distance between the microphone and the distance measurement sensor.

Figure 5A:
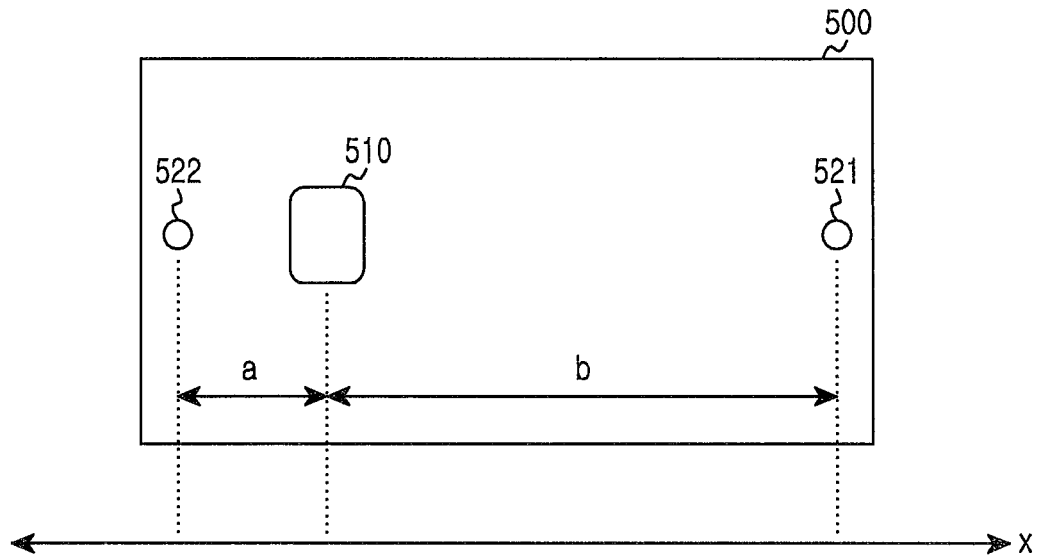
FIGS. 5A and 5B illustrate two microphones disposed horizontally at irregular intervals and their distance calculation in the electronic device according to an example embodiment of the present disclosure.
Figure 5B:
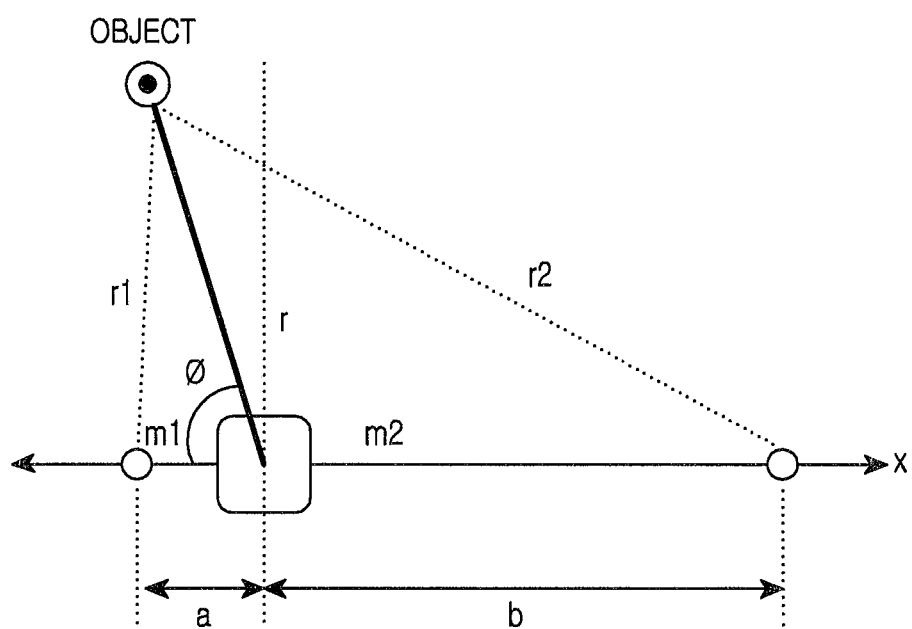

FIGS. 5A and 5B illustrate two microphones disposed horizontally at irregular intervals and their distance calculation in the electronic device according to an example embodiment of the present disclosure.

An electronic device 500 of FIG. 5A includes a distance measurement sensor 510 and a plurality of microphones 521 and 522 horizontally at irregular intervals. When one object of FIG. 5A is selected, the distances between the selected object and the microphones 521 and 522 are calculated in FIG. 5B.

In FIG. 5B, the distances between one object and the microphones 521 and 522 can be calculated based on Equation 3.

$$r_1 = \sqrt{r^2 + a^2 - 2ra\cos\phi}$$
$$r_2 = \sqrt{r^2 + b^2 + 2rb\cos\phi} \quad (3)$$

Herein, $r_1$ denotes the distance between the object and the first microphone, r denotes the distance between the object and the distance measurement sensor, a denotes the distance between the first microphone and the distance measurement sensor, b denotes the distance between the second microphone and the distance measurement sensor, and ϕ denotes the angle between the line segment corresponding to the distance r and the line segment corresponding to the distance between the microphone and the distance measurement sensor.

Figure 6A:
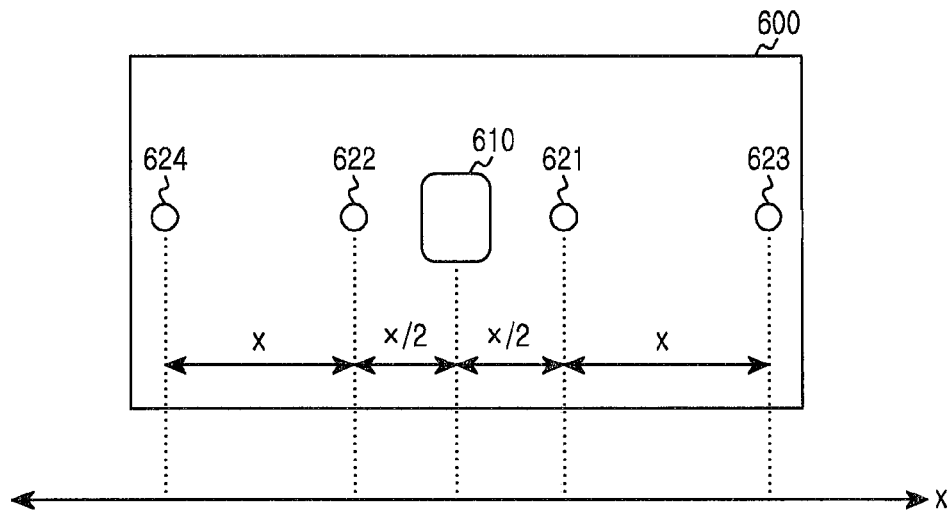
FIGS. 6A, 6B, and 6C illustrate four microphones disposed horizontally at regular intervals and their distance calculation in the electronic device according to an example embodiment of the present disclosure.
Figure 6B:
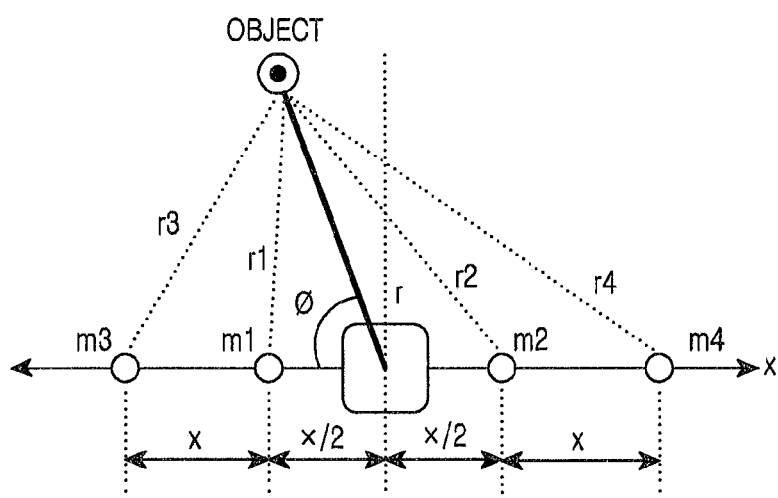
Figure 6C:
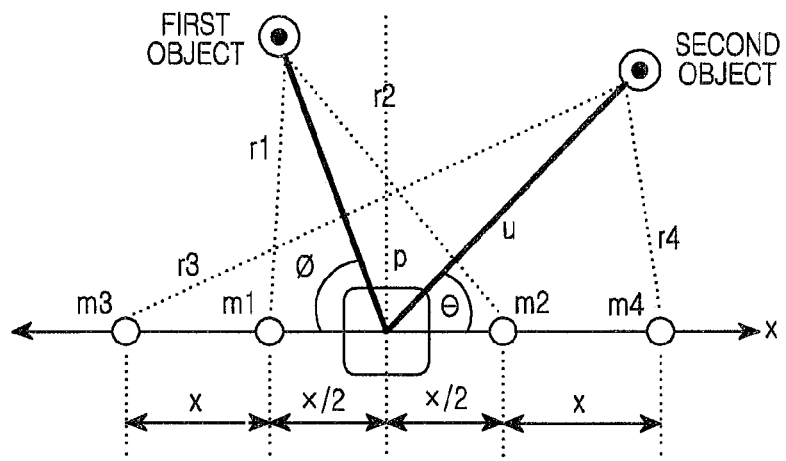

FIGS. 6A, 6B, and 6C illustrate four microphones disposed horizontally at regular intervals and their distance calculation in the electronic device according to an example embodiment of the present disclosure.

An electronic device 600 of FIG. 6A includes a distance measurement sensor 610 and a plurality of microphones 621 through 624 horizontally at regular intervals. When one object of FIG. 6A is selected, the distances between the selected object and the microphones 621 through 624 are calculated in FIG. 6B. When two objects of FIG. 6A are selected, the distances between the selected objects and the microphones 621 through 624 are calculated in FIG. 6C.

In FIG. 6B, the distances between one object and the microphones 621 through 624 can be calculated based on Equation 4.

$$r_1 = \sqrt{r^2 + \left(\frac{x}{2}\right)^2 - rx\cos\phi} \quad (4)$$
$$r_2 = \sqrt{r^2 + \left(\frac{x}{2}\right)^2 + rx\cos\phi}$$
$$r_3 = \sqrt{r^2 + \left(\frac{3x}{2}\right)^2 - 3rx\cos\phi}$$
$$r_4 = \sqrt{r^2 + \left(\frac{3x}{2}\right)^2 + 3rx\cos\phi}$$

Herein, $r_1$ denotes the distance between the first object and the first microphone, $r_2$ denotes the distance between the first object and the second microphone, $r_3$ denotes the distance between the first object and the third microphone, $r_4$ denotes the distance between the first object and the fourth microphone, r denotes the distance between the first object and the distance measurement sensor, x denotes the distance between the first microphone and the second microphone, and ϕ denotes the angle between the line segment corresponding to the distance r and the line segment corresponding to the distance between the microphone and the distance measurement sensor.

In FIG. 6C, the distances between the two objects and the microphones 621 through 624 can be calculated based on Equation 5.

$$r_1 = \sqrt{p^2 + \left(\frac{x}{2}\right)^2 - px\cos\phi} \quad (5)$$
$$r_2 = \sqrt{p^2 + \left(\frac{x}{2}\right)^2 + px\cos\phi}$$
$$r_3 = \sqrt{u^2 + \left(\frac{3x}{2}\right)^2 + 3ux\cos\phi}$$
$$r_4 = \sqrt{u^2 + \left(\frac{3x}{2}\right)^2 - 3ux\cos\phi}$$

Herein, $r_1$ denotes the distance between the first object and the first microphone, $r_2$ denotes the distance between the first object and the second microphone, $r_3$ denotes the distance between the first object and the third microphone, $r_4$ denotes the distance between the first object and the fourth microphone, p denotes the distance between the first object and the distance measurement sensor, u denotes the distance between the second object and the distance measurement sensor, x denotes the distance between the first microphone and the second microphone, ϕ denotes the angle between the line segment corresponding to the distance p and the line segment corresponding to the distance between the microphone and the distance measurement sensor, and θ denotes the angle between the line segment corresponding to the distance u and the line segment corresponding to the distance between the microphone and the distance measurement sensor.

Figure 7A:
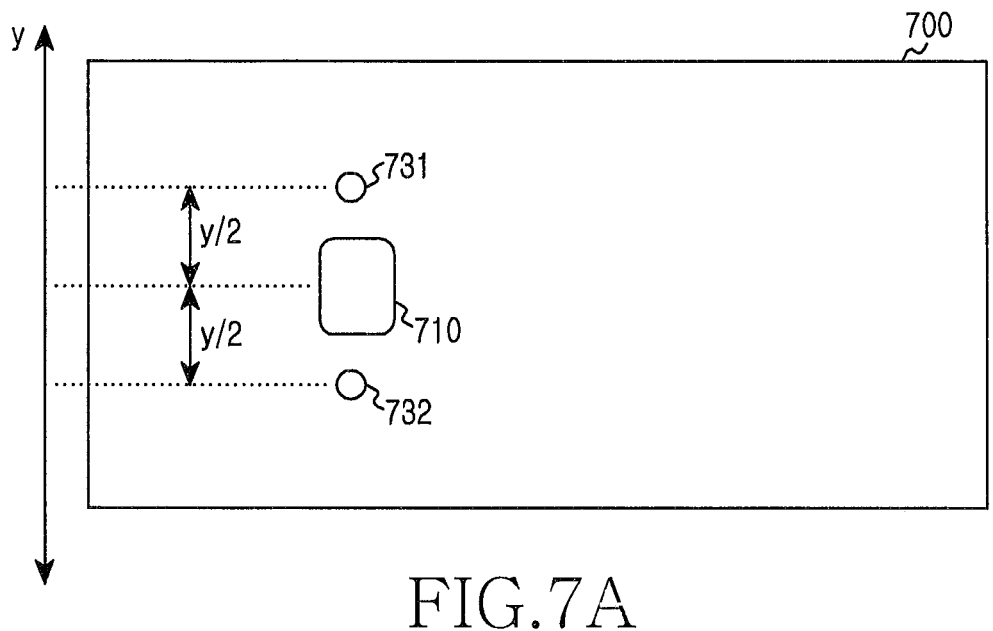
FIGS. 7A and 7B illustrate two microphones disposed vertically at regular intervals and their distance calculation in the electronic device according to an example embodiment of the present disclosure.
Figure 7B:
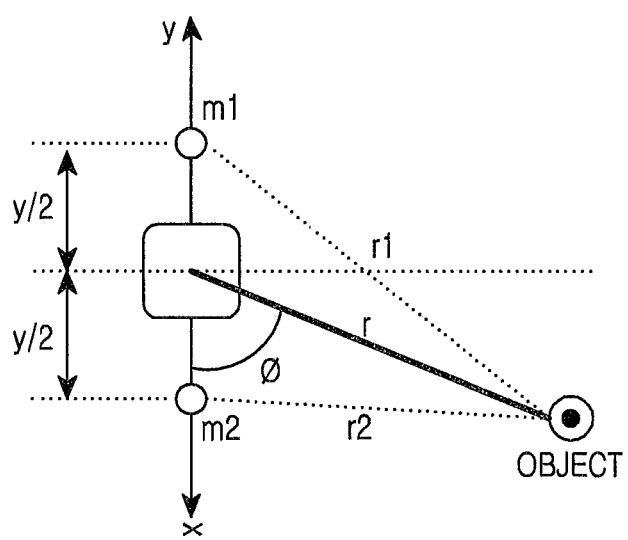

FIGS. 7A and 7B illustrate two microphones disposed vertically at regular intervals and their distance calculation in the electronic device according to an example embodiment of the present disclosure.

An electronic device 700 of FIG. 7A includes a distance measurement sensor 710 and a plurality of microphones 721 and 722 vertically at regular intervals. When one object of FIG. 7A is selected, the distances between the selected object and the microphones 721 and 722 are calculated in FIG. 7B.

In FIG. 7B, the distances between one object and the microphones 721 and 722 can be calculated based on Equation 6.

$$r_1 = \sqrt{r^2 + \left(\frac{y}{2}\right)^2 + ry\cos\phi} \qquad (6)$$

$$r_2 = \sqrt{r^2 + \left(\frac{y}{2}\right)^2 - ry\cos\phi}$$

Herein, $r_1$ denotes the distance between the object and the first microphone, r denotes the distance between the object and the distance measurement sensor, y denotes the distance between the first microphone and the second microphone, and φ denotes the angle between the line segment corresponding to the distance r and the line segment corresponding to the distance between the microphone and the distance measurement sensor.

Figure 8A:
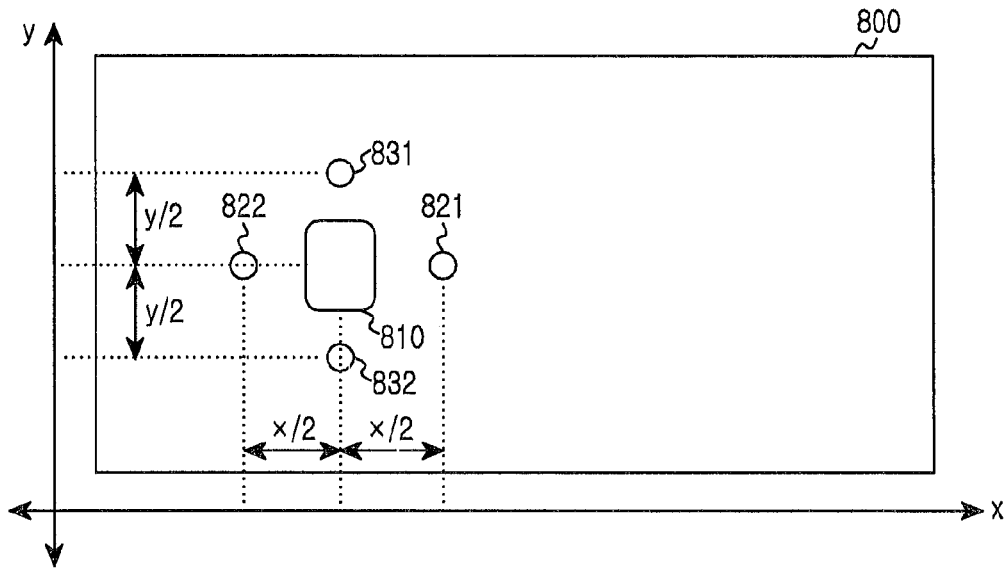
FIGS. 8A, 8B, and 8C illustrate two microphones disposed horizontally at regular intervals, two microphones disposed vertically at regular intervals, and their distance calculation in the electronic device according to an example embodiment of the present disclosure.
Figures 8B, 8C:
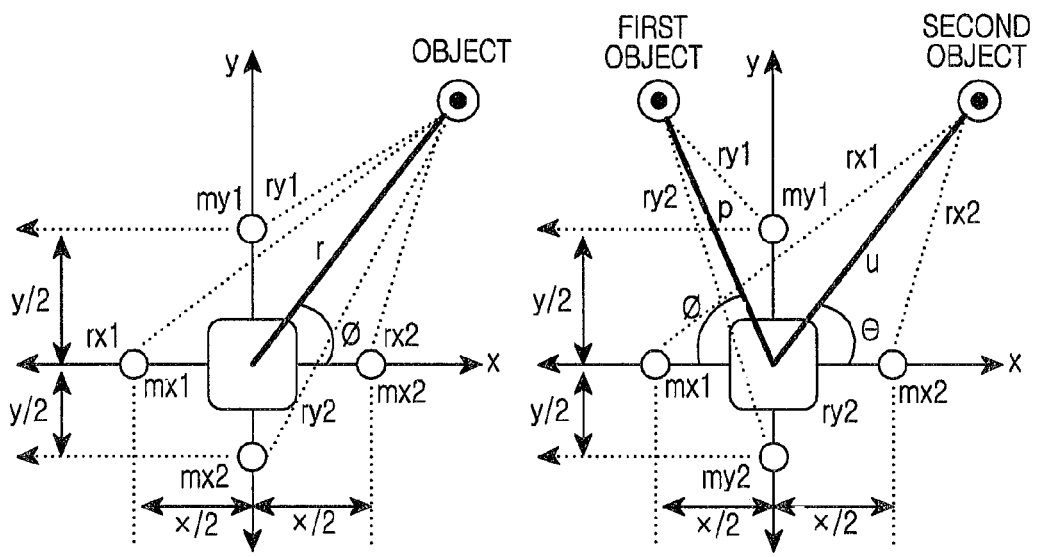

FIGS. 8A, 8B, and 8C illustrate two microphones disposed horizontally at regular intervals, two microphones disposed vertically at regular intervals, and their distance calculation in the electronic device according to an example embodiment of the present disclosure.

An electronic device 800 of FIG. 8A includes microphones 821 and 822 disposed horizontally at regular intervals with a distance measurement sensor 810, and microphones 831 and 832 disposed vertically at regular intervals with the distance measurement sensor 810. When one object of FIG. 8A is selected, the distances between the selected object and the microphones 821, 822, 831, and 832 are calculated in FIG. 8B. When two objects of FIG. 8A are selected, the distances between the selected objects and the microphones 821, 822, 831, and 832 are calculated in FIG. 8C.

In FIG. 8B, the distances between one object and the microphones 821, 822, 831, and 832 can be calculated based on Equation 7.

$$rx_1 = \sqrt{r^2 + \left(\frac{x}{2}\right)^2 + rx\cos\phi} \qquad (7)$$

$$rx_2 = \sqrt{r^2 + \left(\frac{x}{2}\right)^2 - rx\cos\phi}$$

$$ry_1 = \sqrt{r^2 + \left(\frac{y}{2}\right)^2 - ry\sin\phi}$$

$$ry_2 = \sqrt{r^2 + \left(\frac{y}{2}\right)^2 + ry\sin\phi}$$

Herein, $rx_1$ denotes the distance between the first object and the first microphone, $rx_2$ denotes the distance between the first object and the second microphone, $ry_1$ denotes the distance between the first object and the third microphone, $ry_2$ denotes the distance between the first object and the fourth microphone, r denotes the distance between the first object and the distance measurement sensor, x denotes the distance between the first microphone and the second microphone, y denotes the distance between the third microphone and the fourth microphone, and φ denotes the angle between the line segment corresponding to the distance r and the line segment corresponding to the distance between the microphone and the distance measurement sensor.

In FIG. 8C, the distance between the two objects and the microphones 821, 822, 831, and 832 can be calculated based on Equation 8.

$$rx_1 = \sqrt{u^2 + \left(\frac{x}{2}\right)^2 + ux\cos\theta} \qquad (8)$$

$$rx_2 = \sqrt{u^2 + \left(\frac{x}{2}\right)^2 - ux\cos\theta}$$

$$ry_1 = \sqrt{p^2 + \left(\frac{y}{2}\right)^2 - py\sin\phi}$$

$$ry_2 = \sqrt{p^2 + \left(\frac{y}{2}\right)^2 + py\sin\phi}$$

Herein, $rx_1$ denotes the distance between the first object and the first microphone, $rx_2$ denotes the distance between the first object and the second microphone, $ry_1$ denotes the distance between the first object and the third microphone, $ry_2$ denotes the distance between the first object and the fourth microphone, p denotes the distance between the first object and the distance measurement sensor, u denotes the distance between the second object and the distance measurement sensor, x denotes the distance between the first microphone and the second microphone, y denotes the distance between the third microphone and the fourth microphone, φ denotes the angle between the line segment corresponding to the distance p and the line segment corresponding to the distance between the microphone and the distance measurement sensor, and θ denotes the angle between the line segment corresponding to the distance u and the line segment corresponding to the distance between the microphone and the distance measurement sensor.

FIG. 9 illustrates a block diagram of the GSC for the beamforming according to an example embodiment of the present disclosure.

Referring to FIG. 9, the GSC can include a fixed beamformer, a target signal blocking matrix, and a multiple input canceller.

To generate four signals being the target signals of different phases, four microphone outputs can be time-delayed and steered. In so doing, the four signals are sent to the blocking matrix. Using the input signals, the blocking matrix can block the voice signal and output only the noise signal. The blocking matrix, which may need to adaptively reject the noise, can send the noise to the filters FIR1, FIR2, and FIR3. Herein, a filter weight of each filter can be determined by the LMS algorithm.

Using the noise signals output from the target signal blocking matrix, the multiple input canceller can cancel the noise again in the noise-removed output signal of the fixed beamformer.

As such, the time delay or the phase delay corresponding to the distance between the selected object and the microphone can be used to determine the beamforming weight in the GSC or to cancel the noise in the GSC. However, the filter and the performance correction algorithm can vary, not limited to the GSC.

The electronic device can include a plurality of image sensors (e.g., for capturing an image of the corresponding side) corresponding to a first side (e.g., front side, left side, or bottom side) or a second side (e.g., back side, right side, or top side). For example, the electronic device can capture a user's body part (e.g., user's face) using the image sensor corresponding to the front side and capture the background using the image sensor corresponding to the back side.

Figure 10A:
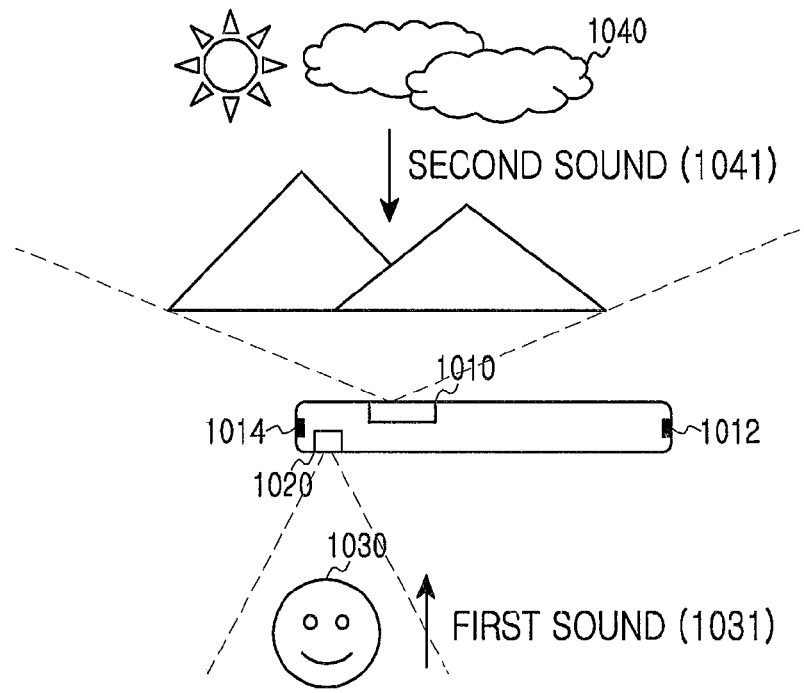
FIGS. 10A, 10B, and 10C illustrate beamforming for audio during the video recording in the electronic device including a dual camera according to an example embodiment of the present disclosure.
Figure 10B:
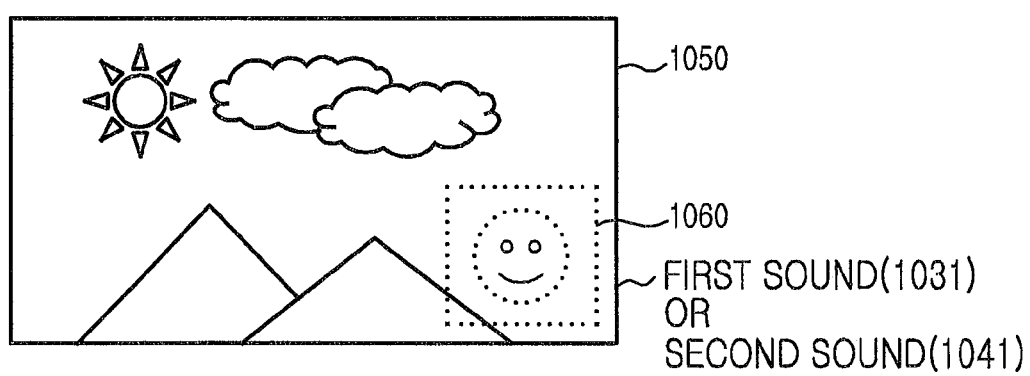
Figure 10C:
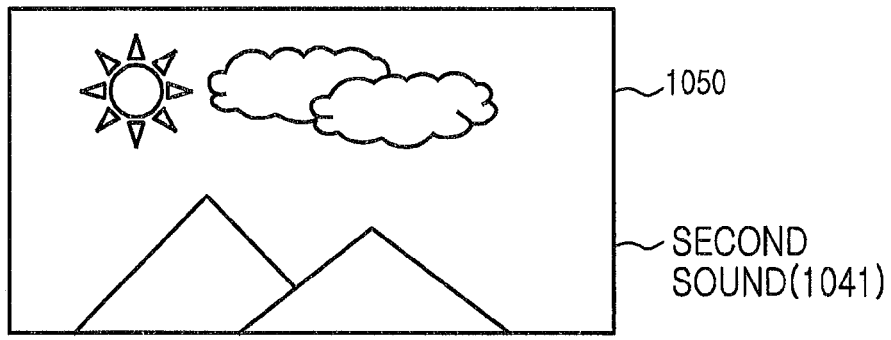

FIGS. 10A, 10B, and 10C illustrate beamforming for audio during the video recording in the electronic device including a dual camera according to an example embodiment of the present disclosure.

FIGS. 10A, 10B, and 10C illustrate dual recording in a portable terminal including a dual camera according to an example embodiment of the present disclosure.

Referring to FIG. 10A, cameras are disposed in the front side and the back side of the electronic device, the camera 1020 in the front side can record a user image 1030, and the camera 1010 in the back side can record a background image 1040. When the camera 1020 and the camera 1010 do the recording, audio can be recorded together with the image through a first microphone 1014 or a second microphone 1012. While the first microphone 1014 or the second microphone 1012 can be disposed at the top and the bottom of the electronic device, the locations of the first microphone 1014 or the second microphone 1012 are not limited to the top and the bottom of the electronic device and can be disposed at various locations.

Referring to FIG. 10B, a background image 1050 captured by the camera 1010 of the back side and a user image 1060 captured by the camera 1020 of the front side can be displayed in the single screen using a Picture in Picture (PIP) function. The PIP function can display a main screen and a separate small screen at the same time. The background image 1050 is the main screen and the user image 1060 is the PIP. In so doing, the user image 1060 can be placed at various locations in the background image. Alternatively, the user image 1060 may be the main screen and the background image 1050 may be the PIP.

In so doing, the beamforming can be performed using the first microphone 1014 and the second microphone 1012. For example, a second sound signal (e.g., background sound) 1041 from the front camera 1020 can be recorded with the image of FIG. 10B, and a first sound signal (e.g., user voice) 1031 from the rear camera 1010 can be recorded with the image of FIG. 10B.

Referring to FIG. 10C, the background image 1050 captured by the rear camera 1010 can be displayed in the single screen. The user image 1030 captured by the front camera 1020 can be used for the beamforming together with the first microphone 1014 and the second microphone 1012. For example, the user image 1030 captured by the front camera 1020 can be used to measure the distance between the user and the distance measurement sensor, and a first distance between the user and the distance measurement sensor can be used to calculate a second distance between the first microphone 1014 or the second microphone 1012 and the user. The second distance can be used to acquire the first sound signal 1031 or the second sound signal 1041 using the beamforming.

Thus, the first sound signal 1031 or the second sound signal 1041 acquired using the beamforming can be recorded together with the background image 1050 captured by the rear camera 1010.

Figure 11:
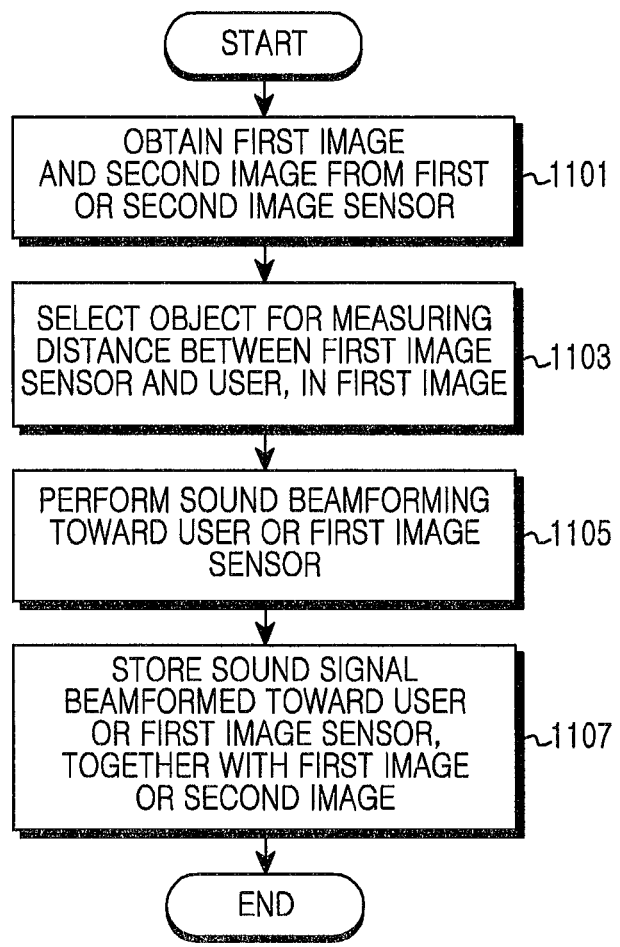
FIG. 11 illustrates a process of beamforming for the audio during the video recording in the electronic device including the dual camera according to an example embodiment of the present disclosure.

FIG. 11 illustrates a process of beamforming for the audio during the video recording in the electronic device including the dual camera according to an example embodiment of the present disclosure.

Referring to FIG. 11, the electronic device can obtain the first image and the second image from the first or second image sensor in operation 1101, and select the object (e.g., the user in the first image) for measuring the distance between the first image sensor and the user, from the first image in operation 1103.

In operation 1105, the electronic device can calculate the distance between the microphone and the user using the distance between the first image sensor and the user and then perform the sound beamforming toward the user or the first image sensor.

In operation 1107, the electronic device can record and store the sound signal beamformed toward the user or the first image sensor, together with the first image or the second image.

Figure 12:
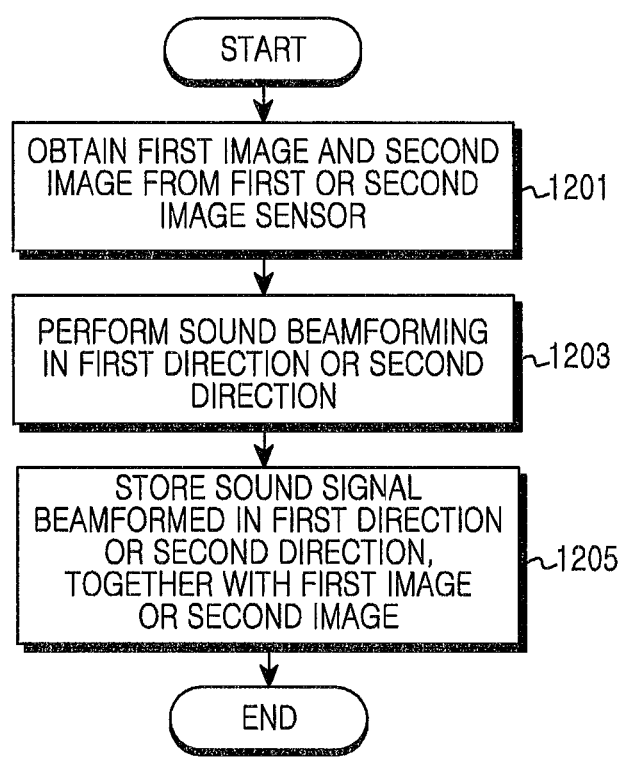
FIG. 12 illustrates a process of beamforming for the audio during the video recording in the electronic device including the dual camera according to an example embodiment of the present disclosure.

FIG. 12 illustrates a process of beamforming during the video recording in the electronic device including the dual camera according to an example embodiment of the present disclosure.

Referring to FIG. 12, the electronic device can obtain the first image and the second image from the first or second image sensor in operation 1201, and perform the sound beamforming in the first direction or the second direction in operation 1203.

In operation 1205, the electronic device can record and store the sound signal beamformed in the first direction or the second direction, together with the first image or the second image.

Figure 13:
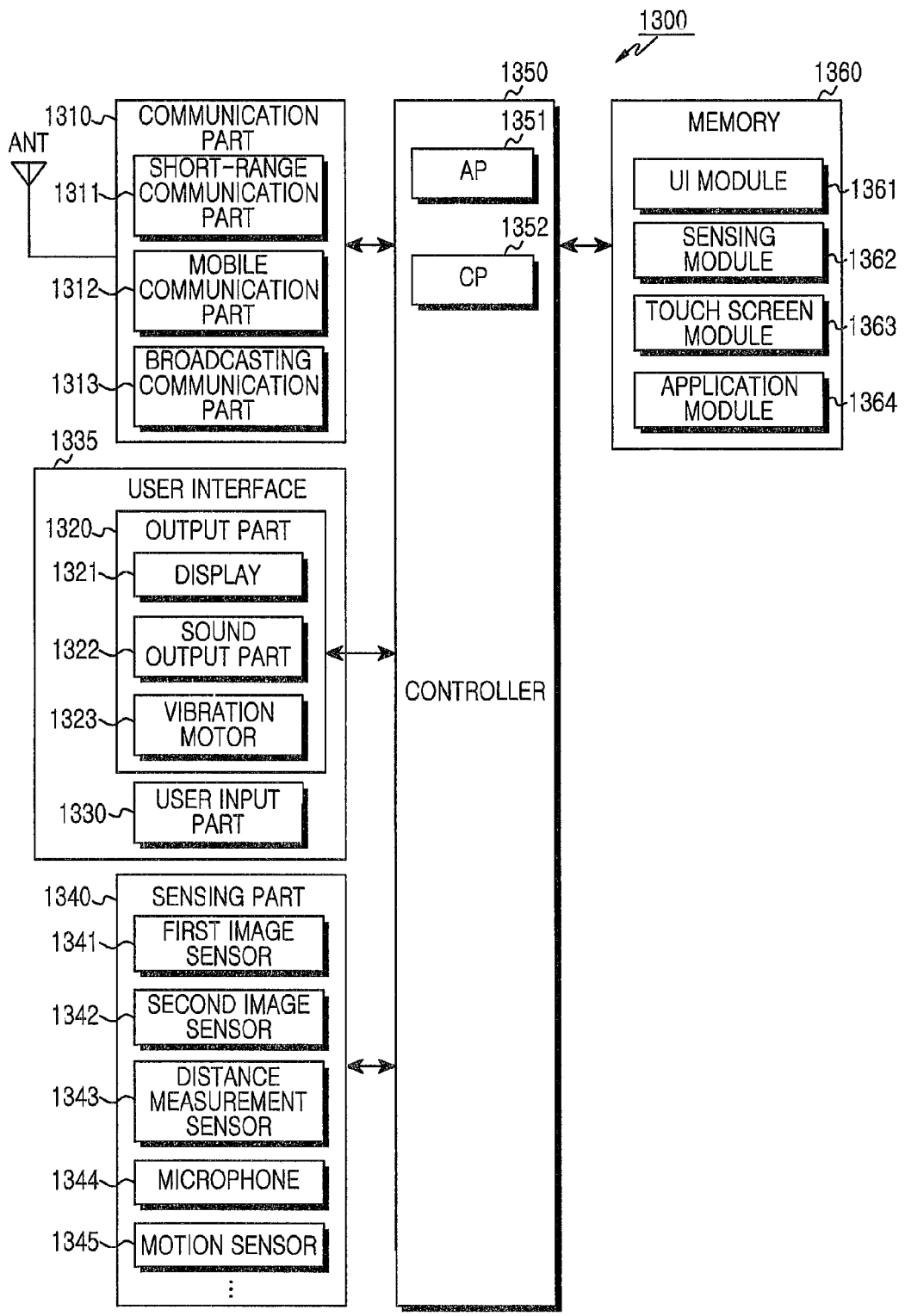
FIG. 13 illustrates the electronic device according to an example embodiment of the present disclosure.

FIG. 13 illustrates a block diagram of the electronic device according to an example embodiment of the present disclosure.

The electronic device 1300 can employ devices such as portable terminal, mobile terminal, mobile pad, media player, tablet computer, handheld computer, Personal Digital Assistant (PDA), server, personal computer, and wearable device. The electronic device 1300 may be an electronic device combining two or more functions of those devices.

The electronic device 1300 can include a communication part 1310, a user interface 1335, a sensing part 1340, a controller 1350, and a memory 1360. The user interface 1335 can include an output part 1320 and a user input part 1330. The sensing part 1340 can include a first image sensor 1341, a second image sensor 1342, a distance measurement sensor 1343, a microphone 1344, and a motion sensor 1345.

The first image sensor 1341 or the second image sensor 1342 can perform a camera function such as photo and video clip recording. Alternatively, the first and second image sensors 1341 and 1342 may be separated from the electronic device 1300 and coupled to the electronic device 1300 using radio connection such as Near Field Communication (NFC), Bluetooth, Bluetooth Low Energy (BLE), 3G network, 4G network, or WiFi Direct. More specifically, the first image sensor 1341 can be disposed at the back of the electronic device 1300, and the second image 1342 can be disposed in the front side of the electronic device 1300. The electronic device 1300 can further include an optical part (not shown) and a signal processor (not shown). The optical part can be driven by a mecha-shutter, a motor, and an actuator, and the actuator can perform zooming and focusing. The optical part captures a surrounding image, and the image sensor can detect and convert the image captured by the optical sensor to an electric signal. Herein, the image sensor can employ a Complementary Metal Oxide Semiconductor (CMOS) or Charge Coupled Device (CCD) sensor, or a high-resolution image sensor.

The first image sensor 1341 or the second image sensor 1342 can employ a 3D depth sensor used for the distance measurement of the stereo type, the TOF type, and the structured light type. The stereo type, the TOF type, and the structured light type can extract the distance between the object and the sensor or between the object and the camera, and an angle based on the image center using a depth map. Herein, the algorithm for extracting the distance between the object and the sensor or between the object and the camera, and the angle based on the image center using the depth map can be realized using various distance measurement and angle measurement algorithms, and is not limited one specific distance measurement and angle measurement algorithm.

The distance measurement sensor 1343 can measure the distance by sending directional infrared light, ultrasonic waves, or electromagnetic wave to the object and measuring the time until the reflected wave is received from the object.

The microphone 1344 can input an audio stream for voice recognition, voice reproduction, digital recording, and phone call. For example, the microphone 1344 can convert the voice signal to an electric signal. Herein, the plurality of the microphone 1344 can form the microphone array. Referring back to FIG. 1, the beamforming can be fulfilled using the microphone array.

The motion sensor 1345 can include a geomagnetic sensor for detecting the direction, and an accelerometer or a gyro sensor for detecting the motion.

The user interface 1335 can, if necessary, select at least one target of the microphone beamforming according to the user input in the process of the beamforming using the microphone in various modes (e.g., video shooting, video call, voice recording, voice call, and still image capturing including voice information) of the user device.

The user interface 1335, after the microphone beamforming of the selected object is set, can automatically track the object, calculate and correct the first distance between the distance measurement sensor (e.g., 3D depth sensor 1341 and 1342 or distance measurement sensor 1343) and the selected object and the second distance (time delay or phase delay) between the microphone 1344 and the selected object, and continuously track and display the object.

The output part 1320 can include a display 1321, a sound output part 1322, and a vibration motor 1323, for outputting the audio signal, the video signal, or a vibration signal). The display 1321 can output information processed by the electronic device 1300. For example, in the call mode, the display 1321 can display a User Interface (UI) or a Graphic User Interface (GUI) for the call. The display 1321 can display a UI for tracking the object selected and designated for the beamforming.

In an embodiment, when the display 1321 and a touch are layered as a touch screen, the touch screen can function as the user input 1330 in addition to the output part 1320. The display 1321 can include at least one of liquid crystal display, thin film transistor-liquid crystal display, organic light-emitting diode, flexible display, 3D display, and electrophoretic display. According to various implementations, the electronic device 1300 may include two or more displays 1321. In this embodiment, the two or more displays 1321 can face each other using a hinge.

The sound output part 1322 can output audio data received from the communication part 1310 or stored in the memory 1360. The sound output part 1322 can output a sound signal of music contents obtained and stored using the sound beamforming or music content streamed in real time through the voice call or the video call. The sound output part 1322 can output a sound signal relating to the function (e.g., call receiving sound, message receiving sound) of the electronic device 1300. The sound output part 1322 can include a speaker, a buzzer, and so on.

The vibration motor 1323 can output the vibration signal. The vibration motor 1323 can output the vibration signal as tactile feedback when the user input is received for a guide icon. The vibration motor 1323 can output the vibration signal corresponding to the output of the audio data or the video data (e.g., call reception sound, message reception sound). When the touch is applied to the touch screen, the vibration motor 1323 may output the vibration signal. Herein, to provide the same haptic effect as the vibration signal as the tactile feedback, Electro Active Polymer (EAP) or piezo may be included together with or instead of the vibration motor 1323.

The user input part 1330 can receive the user input for setting the guide in a guide setting mode. The user input part 1330 can designate the icon or the contents for the guide according to the user input.

The user input part 1330 can indicate a means for the user to input data to control the electronic device 1300. For example, the user input part 1330 can include, but not limited to, a button implemented using a software module or a physical equipment and a circuit, a keypad, a dome switch, a touch pad (contact-type capacitive overlay, inductive type, resistive overlay, infrared beam detection type, surface acoustic wave type, integral strain gauge type, piezo electric type), a jog wheel, and a jog switch. As mentioned earlier, the display 1321 and the touch pad may be united to construct the touch screen. When the touch screen includes the capacitive or inductive touch pad, the touch screen may receive the user input through an accessory such as capacitive or inductive pen.

The communication part 1310 can include a short-range communication part 1311, a mobile communication part 1312, and a broadcasting receiver 1313, for the communication function. For example, under control of a Communication Processor (CP) 1352, the communication part 1310 can convert a Radio Frequency (RF) signal to a baseband signal and provide the baseband signal to the CP 1352, or convert a baseband signal from the CP 1352 to the RF signal and transmit the RF signal. Herein, the CP 1352 can process the baseband signal based on various communication schemes. For example, the communication schemes can include, but not limited to, Global System for Mobile Communication (GSM), Enhanced Data GSM Environment (EDGE), Code Division Multiple Access (CDMA), W-CDMA, Long Evolution Network (LTE), Orthogonal Frequency Division Multiple Access (OFDMA), Wireless Fidelity (WiFi), WiMax, and/or Bluetooth.

An Application Processor (AP) 1351 can perform various functions for the electronic device 1300 by running various software programs, and the CP 1352 can process and control the voice communication and the data communication. In addition to those functions, the processors 1351 and 1352 may execute a particular software module (instruction set) stored in the memory 1360 and conduct particular functions corresponding to the module. That is, the processors 1351 and 1352 can carry out the beamforming method for acquiring the sound signal in association with software modules stored in the memory 1360.

For example, the AP 1351 can select at least one object for the beamforming using the internal microphone array. Herein, the beamforming object can be selected based on the image captured by the image sensor of the electronic device 1300 or using the voice recognition. For example, referring back to FIG. 3, at least one object can be selected in the displayed image. For example, a particular face may be recognized and automatically selected in the displayed image. For example, the lips or the lip motion may be recognized and automatically selected in the displayed image. For example, the face recognition can trace a particular person and perform the beamforming based on the particular person, the lip motion recognition can trace the speaker and perform the beamforming based on the speaker, and the lip recognition can enhance the beamforming performance by recognizing the lips in the face and measuring the accurate distance to the lips from which the sound of the object is produced. For example, when the preregistered voice is input, the object corresponding to the input voice can be selected through the voice recognition. For example, when a particular voice is input, the location or the direction of the object corresponding to the particular voice may be detected and thus the beam may be formed to the object corresponding to the particular voice. For example, the object can be selected using all of the voice recognition, the face recognition, and the lip recognition. For example, the beamforming can be performed by recognizing a particular person in the displayed image and tracing the lip motion of the particular person.

The AP 1351 can measure the first distance between the selected object and the distance measurement sensor using the distance measurement sensor, and calculate the second distance or the time delay (or phase delay) between the selected object and the microphone using the first distance measured. The second distance using the first distance can be measured according to one example embodiment of the present disclosure of FIGS. 4 through 8. Based on the time delay or the phase delay corresponding to the second distance between the selected object and the microphone, the AP 1351 can perform the beamforming by applying the filter and the correction algorithm for the performance enhancement, for example, the adaptive beamforming such as GSC and LCMV, acquire the sound signal of the selected object by applying the corresponding filter or correction algorithm based on the time delay or the phase delay corresponding to the second distance, and store the sound signal of the object, which is beamformed and received, in a memory or send the sound signal over the network.

Alternatively, the AP 1351 can obtain the first image and the second image from the first or second image sensor, select the object (e.g., the user in the first image) for measuring the distance between the first image sensor and the user, from the first image, calculate the distance between the microphone and the user using the distance between the first image sensor and the user, perform the sound beamforming toward the user or the first image sensor, and record and store the sound signal beamformed toward the user or the first image sensor, together with the first image or the second image.

Alternatively, the AP 1351 can obtain the first image and the second image from the first or second image sensor, perform the sound beamforming in the first direction or the second direction, and record and store the sound signal beamformed in the first direction or the second direction, together with the first image or the second image.

The memory 1360 can store software of a UI module 1361, a sensing module 1362, a touch screen module 1363, and an application module 1364. Software components can include an operating system software module, a communication software module, a graphic software module, a UI software module, a touch screen module, a camera software module, and one or more application software modules. Since the module being the software component can be a set of instructions, the module may be referred to as an instruction set. The module may be referred to as a program.

The operating system software can include various software components for controlling general system operations. The control of the general system operations includes, for example, memory management and control, storage hardware (device) control and management, and power control and management. The operating system software may process normal communication between various hardware devices and the software components (modules).

The communication software module allows the communication with other electronic devices such as computer, server, and/or portable terminal, through the communication part 1310. The communication software module is configured in a protocol architecture of the corresponding communication scheme.

The graphic software module can include various software components for providing and displaying graphics on the touch screen. The term 'graphics' can embrace text, webpage, icon, digital image, video, animation, and the like.

The UI module 1361 can include various software components relating to the user interface. The UI module 1361 is involved in the status change of the user interface and the condition of the user interface status change. The sensing module 1362 can include sensor software components for sensor processes and functions, and the touch screen module 1363 can include touch screen software components for touch screen processes and functions.

The application module 1364 can include a browser, an e-mail, an instant message, a word processing, keyboard emulation, an address book, a touch list, a widget, Digital Right Management (DRM), voice recognition, voice reproduction, a position determining function, a location based service, and the like. The memory 1360 can include an additional module (instructions) in addition to the above-stated modules. Alternatively, if necessary, some of the modules (instructions) may not be used.

The application module can include instructions for the beamforming to acquire the sound signal (see FIGS. 2, 11, and 12).

For example, the application module can include instructions for selecting at least one object for the beamforming using the internal microphone array, measuring the first distance between the selected object and the distance measurement sensor using the distance measurement sensor, and calculating the second distance or the time delay (or phase delay) between the selected object and the microphone using the first distance measured. The second distance using the first distance can be measured according to one example embodiment of the present disclosure of FIGS. 4 through 8. Based on the time delay or the phase delay corresponding to the second distance between the selected object and the microphone, the application module can include instructions for performing the beamforming by applying the filter and the correction algorithm for the performance enhancement, for example, the adaptive beamforming such as GSC and LCMV, acquiring the sound signal from the selected object by applying the corresponding filter or correction algorithm based on the time delay or the phase delay corresponding to the second distance, and storing the sound signal of the object, which is beamformed and received, in the memory or sending the sound signal over the network.

Alternatively, the application module can include instructions for obtaining the first image and the second image from the first or second image sensor, selecting the object (e.g., the user in the first image) for measuring the distance between the first image sensor and the user, from the first image, calculating the distance between the microphone and the user using the distance between the first image sensor and the user, performing the sound beamforming toward the user or the first image sensor, and recording and storing the sound signal beamformed toward the user or the first image sensor, together with the first image or the second image.

Alternatively, the application module can include instructions for obtaining the first image and the second image from the first or second image sensor, performing the sound beamforming in the first direction or the second direction, and recording and storing the sound signal beamformed in the first direction or the second direction, together with the first image or the second image.

FIGS. 14A, 14B, and 14C illustrate stereo-type distance measurement according to an example embodiment of the present disclosure.

Referring to FIG. 14A, the stereo type measures a 3D shape of the object using images from a pair of cameras 1400 and 1410 or more cameras like two eyes of the human.

For example, the 3D distance measurement is based on triangulation. When two cameras having a base line b (the distance between the first camera and the second camera) capture images 1420 and 1430 and detect the same point in the two images and a known focus length f is given, the depth or the distance can be determined based on Equation 9. Herein, the image 1420 is captured by the first camera 1400 and the image 1430 is captured by the second camera 1410.

$$\text{depth} = \frac{f \cdot b}{d} \tag{9}$$

Herein, b denotes the base distance between the first camera and the second camera, f denotes the focus length, and d denotes disparity indicating a difference between a point of the left image and a corresponding point of the right image.

Referring to FIG. 14B, d1 denotes a distance between the depth and a matching point in the image 1420 captured by the first camera 1400, d2 denotes a distance between the depth and the matching point in the image 1430 captured by the second camera 1410, and the disparity d is defined as $|d_1 - d_2|$. The matching point indicates the same point in the left and right images.

When the depth is determined based on Equation 9, the first image 1420 and the second image 1430 can be mapped to a color corresponding to the depth according to various stereo matching schemes as shown in FIG. 14C, which is hereafter referred to as the depth map 1440. For example, the depth map indicates the 3D distance difference between the objects in the image and represents each pixel with a value ranging from 0 to 255. As the depth gets high (white), the distance between the camera and the object can be reduced.

FIGS. 15A and 15B illustrate the structured light distance measurement according to an example embodiment of the present disclosure.

Referring to FIG. 15A, a depth map capturing system using the structured light emits a pattern image to an object 1530 for the depth map through a projector 1500. Next, the system captures the corresponding scene using a camera 1510. In so doing, as the depth of the corresponding scene varies, the pattern 1540 projected by the projector 1500 can differ from a pattern 1513 of an image plane 1512 captured by the camera 1510. The 3D location of the scene can be estimated based on these two patterns 1540 and 1513.

In so doing, various patterns can be used. For example, the patterns can include a black & white pattern, a gray scale pattern, or a color pattern, based on whether the depth image can be acquired from a dynamic object. The black & white pattern simplifies an experiment with a binary pattern and easily acquires a high-resolution depth map. However, the black & white pattern can acquire the depth map only from the stationary scheme, not the moving object, because it may need to project many consecutive patterns to one scene. The gray scale or color pattern, unlike the binary pattern, can reduce the number of pattern images for one scene and thus obtain the depth map even from the moving object.

For example, referring to FIG. 15B, the structured light can estimate the 3D location (e.g., depth map) by continuously projecting the pattern image and capturing the image of the structured light through the camera.

Figure 16A:
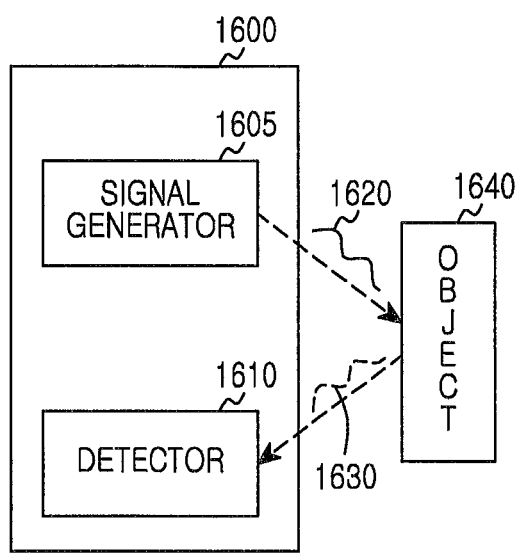
FIGS. 16A and 16B illustrate Time of Flight (TOF) distance measurement according to an example embodiment of the present disclosure.
Figure 16B:
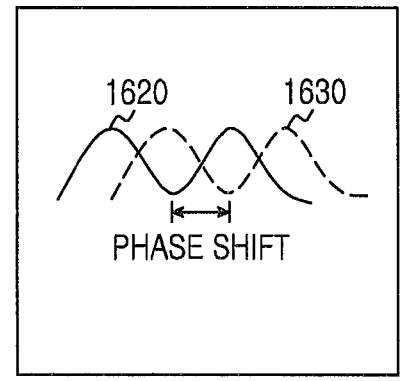

FIGS. 16A and 16B illustrate the TOF distance measurement according to an example embodiment of the present disclosure.

Referring to FIG. 16A, the TOF measures the time t taken for the signal to travel back from the object surface and calculates the distance by multiplying the time by the speed of light c.

For example, a TOF-based depth camera 1600 can include a signal generator 1605 and a detector 1610. The signal generator 1605 can emit a laser or infrared light source 1620 to a surface of an object 1640. The detector 1610 can measure the travel time or the phase difference 1630 of the laser or infrared light source emitted by the signal generator 1605.

The TOF can be divided into a method for measuring the distance by emitting a pulse signal and measuring the time for the pulse signals reflected by objects in a measurement range to arrive at a receiver, and a method for calculating the time and the distance by emitting the laser beam modulated continuously with a particular frequency and measuring a phase change of the signal reflected by the object in the measurement range. FIG. 16B depicts phase shift between the unreflected signal 1620 and the reflected signal 1630.

In an embodiment, the depth map can be determined using the stereo type, the structured light, or the TOF, and the angle based on the image center or the object speed can be calculated based on the depth map beside the object distance measurement.

The methods described in the claims and/or the specification of the present disclosure can be implemented using hardware and software alone or in combination.

As for the software, a computer-readable storage medium containing one or more programs (software modules) can be provided. One or more programs stored to the computer-readable storage medium are configured for execution of one or more processors of the electronic device. One or more programs can include instructions making the electronic device execute the methods according to the example embodiments as described in the claims and/or the specification of the present disclosure.

The program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the program can be stored to a memory combining part or all of those recording media. A plurality of memories may be equipped.

The program can be stored to an attachable storage device of the electronic device accessible via the communication network such as Internet, Intranet, Local Area Network (LAN), Wide LAN (WLAN), or Storage Area Network (SAN), or a communication network combining the networks. The storage device can access the electronic device through an external port.

A separate storage device in the communication network can access a portable electronic device.

As set forth above, the beamforming is achieved by selecting the desired object for the sound extraction in the process of the phone call, the voice recording, or the video recording, measuring the object and the image sensor, and measuring the distance between the object and the microphones. Therefore, the beamforming performance for acquiring the sound signal can be enhanced.

While the disclosure has been shown and described with reference to certain example embodiments thereof, it will be understood by those skilled in the art that various changes in form and details may be made therein without departing from the spirit and scope of the disclosure as defined by the appended claims and their equivalents.

What is claimed is:

1. A method in an electronic device, the method comprising:
   selecting at least one object to acquire a sound;
   measuring a first distance between the at least one object and a sensor using the sensor;
   determining a second distance between the at least one object and a microphone based on the first distance; and
   determining a weight for sound beamforming of the microphone using at least one of a time delay and phase delay corresponding to the second distance between the object and the microphone.

2. The method of claim 1, further comprising:
   detecting a location change of the at least one object;
   re-measuring the first distance between the at least one object and the sensor;
   re-determining the second distance between the object and the microphone based on the re-measured first distance; and
   re-determining the weight for the sound beamforming of the microphone using at least the one of the time delay and the phase delay corresponding to the re-determined second distance.

3. The method of claim 1, wherein the selecting of the at least one object comprises:
   selecting the object in a displayed image using at least one of user touch input, face recognition, lip motion detection, lip recognition, and voice recognition.

4. The method of claim 1, wherein the sound beamforming of the microphone is performed for at least one of voice acquisition during video recording, voice recording, photo shooting, game, and phone call.

5. The method of claim 1, wherein the determining of the weight for the sound beamforming is performed using one of Generalized Side-lobe Canceller (GSC) and Linearly Constrained Minimum Variance (LCMV).

6. The method of claim 1, wherein the sensor comprises at least one of a 3D image sensor, a 3D depth sensor, and a distance measurement sensor.

7. The method of claim 1, wherein the first distance between the at least one object and the sensor is measured using at least one of a stereo type, a Time of Flight (TOF) type, and a structured light type, which are distance measurement methods using at least one of the 3D depth sensor and the 3D image sensor.

8. A method for operating an electronic device, the method comprising:
   obtaining a first image and a second image from at least one of a first and second image sensor;
   selecting an object for measuring a distance to the first image sensor, in the first image;
   determining a second distance between a plurality of microphones and the object using the first distance between the first image sensor and the object, and receiving a sound signal by performing beamforming of the microphones based on the second distance; and
   storing the sound signal together with at least the one of the first image and the second image.

9. The method of claim 8, wherein the performing of the beamforming based on the second distance comprises:
   determining a weight for sound beamforming using at least one of a time delay and phase delay corresponding to the second distance between the object and the microphone; and
   receiving the sound signal by forming a beam based on the weight.

10. The method of claim 8, wherein the object is a user of the electronic device.

11. A method for operating an electronic device, the method comprising:
    obtaining an image via a first image sensor, and a distance between an object and the electronic device via a second image sensor;
    obtaining, using a sound beamforming scheme based at least in part on the distance, a sound signal via a microphone from a direction corresponding to the second image sensor; and
    presenting, via a display operatively coupled with the electronic device, the image and an indication corresponding to the sound signal in at least one portion of the image.

12. An electronic device comprising:
    a sensor;
    a microphone; and
    a processor configured to:
      select at least one object to acquire a sound,
      measure a first distance between the at least one object and a sensor using the sensor,
      determine a second distance between the at least one object and a microphone based on the first distance, and
      determine a weight for sound beamforming of the microphone using at least one of a time delay and phase delay corresponding to the second distance between the object and the microphone.

13. The electronic device of claim 12, wherein the processor is further configured to:
    detect a location change of the at least one object,
    re-measure the first distance between the at least one object and the sensor,
    re-determine the second distance between the object and the microphone based on the re-measured first distance, and
    re-determine the weight for the sound beamforming of the microphone using the at least one of the time delay and the phase delay corresponding to the re-determined second distance.

14. The electronic device of claim 12, wherein the at least one object is selected in a displayed image using at least one of user touch input, face recognition, lip motion detection, lip recognition, and voice recognition.

15. The electronic device of claim 12, wherein the sound beamforming of the microphone is performed for at least one of voice acquisition during video recording, voice recording, photo shooting, or game, and phone call.

16. The electronic device of claim 12, wherein the weight for the sound beamforming is determined using one of Generalized Side-lobe Canceller (GSC) and Linearly Constrained Minimum Variance (LCMV).

17. The electronic device of claim 12, wherein the sensor comprises at least one of a 3D image sensor, a 3D depth sensor, and a distance measurement sensor.

18. The electronic device of claim 12, wherein the first distance between the at least one object and the sensor is measured using at least one of a stereo type, a Time of Flight (TOF) type, and a structured light type, which are distance measurement methods using at least one of the 3D depth sensor and the 3D image sensor.

19. An electronic device comprising:
a processor configured to:
obtain a first image and a second image from at least one of a first and second image sensor,
select an object for measuring a distance to the first image sensor, in the first image,
determine a second distance between a plurality of microphones and the object using the first distance between the first image sensor and the object,
receive a sound signal by performing beamforming of the microphones based on the second distance, and
store the sound signal, together with the at least one of the first image and the second image.

20. The electronic device of claim 19, wherein, to perform the beamforming toward the first image sensor, the processor is further configured to:
determine a weight for sound beamforming using at least one of a time delay and phase delay corresponding to the second distance between the object and the microphone, and
form a beam and receives a sound by applying the sound beamforming weight to the microphones.

21. The electronic device of claim 19, wherein the object is a user of the electronic device.

22. An electronic device comprising:
a first image sensor;
a second image sensor;
a microphone; and
a processor configured to:
obtain an image via the first sensor, and a distance between an object and the electronic device via the second image sensor,
obtain, using a sound beamforming scheme based at least in part on the distance, a sound signal via the microphone from a direction corresponding to the second image sensor, and
present, via a display operatively coupled with the electronic device, the image and an indication corresponding to the sound signal in at least one portion of the image.

* * * * *